(12) United States Patent
Yoon et al.

(10) Patent No.: US 7,970,438 B2
(45) Date of Patent: Jun. 28, 2011

(54) MOBILE TERMINAL AND KEYPAD CONTROL METHOD

(75) Inventors: Sang-Yeob Yoon, Gyeonggi-Do (KR); Kyung-Lack Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/142,610

(22) Filed: Jun. 19, 2008

(65) Prior Publication Data

US 2008/0318635 A1      Dec. 25, 2008

(30) Foreign Application Priority Data

Jun. 19, 2007 (KR) .................. 10-2007-0060037
Oct. 2, 2007 (KR) .................. 10-2007-0099482

(51) Int. Cl.
*H04B 1/38*       (2006.01)
*H04M 1/00*       (2006.01)

(52) U.S. Cl. .............. 455/566; 455/575.1; 455/575.3; 455/186.2; 345/168; 345/173; 345/682

(58) Field of Classification Search .............. 455/566, 455/550.1, 186.2, 575.3, 575.4; 345/168, 345/173, 682, 684
See application file for complete search history.

(56) References Cited

U.S. PATENT DOCUMENTS

2005/0140660 A1* 6/2005 Valikangas .................. 345/173
2006/0007178 A1* 1/2006 Davis ........................ 345/173
* cited by examiner

*Primary Examiner* — Tuan A Pham
(74) *Attorney, Agent, or Firm* — Birch, Stewart, Kolasch & Birch, LLP

(57) ABSTRACT

A mobile terminal including a display unit configured to display a keypad in a second display region and data input from at least the keypad in a first display region, and a controller configured to determine if the keypad displayed in its current form is to be displayed in a new different form, to determine if all of the keypad in the new different form can be displayed to fit within the second display region, and to selectively control the display unit to display a scrolling function for scrolling the keypad displayed in the new different form when all of the keypad can not be displayed to fit within the second display region.

28 Claims, 25 Drawing Sheets

FIG. 7D
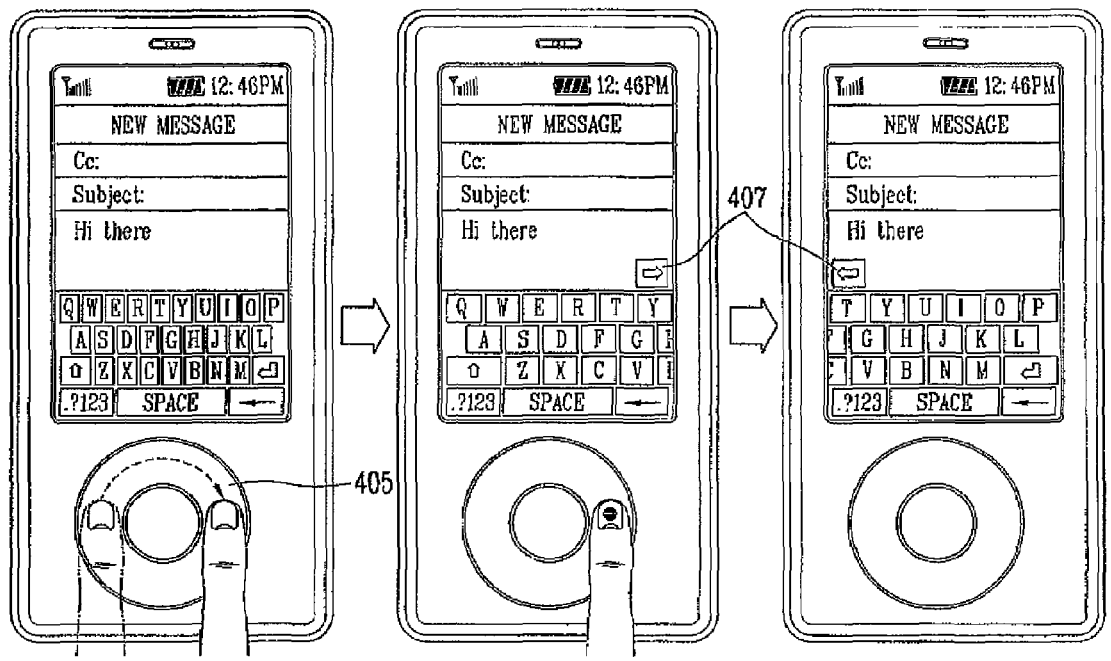
(a) (b) (c)
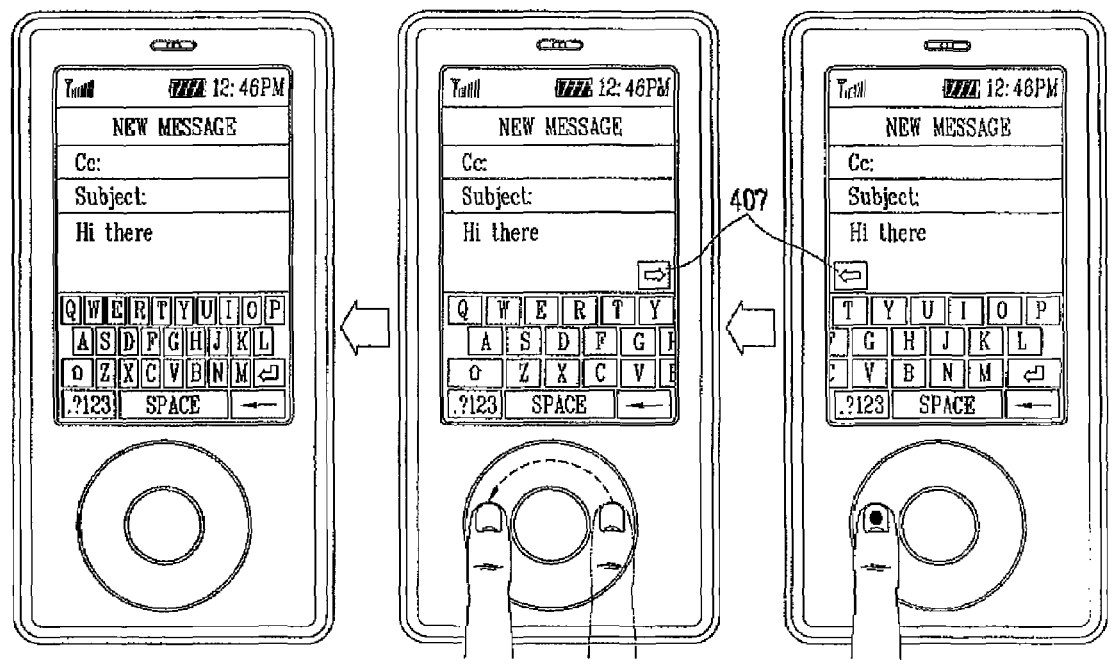
(f) (e) (d)

(a)  (b)

# MOBILE TERMINAL AND KEYPAD CONTROL METHOD

This application claims priority to Korean Patent Applications No. 10-2007-0060037 and No. 10-2007-0099482 filed in Korea on Jun. 19, 2007 and Oct. 2, 2007, respectively, the entire contents of both are hereby incorporated by reference in its entirety.

BACKGROUND OF THE INVENTION

1. Field of the Invention

The present invention relates to a mobile terminal, and more particularly to a mobile terminal and corresponding keypad control method for controlling a keypad by using a magnification/reduction function and a scroll function.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In general, mobile terminals include a Liquid Crystal Display (LCD) that displays various information and a keypad for allowing the user to input numbers or characters into their terminal. Many terminals now include touch screen features that the user can touch to enter or input information.

However, mobile terminals are small in size, and therefore mobile terminals that include such a touch screen, display edited content and the keypad for inputting information on a small screen. Thus, it is particularly difficult for users to enter information using the displayed touch screen keypad, especially people with large hands or elderly people. Further, because the keypad takes half or more of the display screen, the user has difficulty in viewing input or received content displayed on the display screen of the terminal.

SUMMARY OF THE INVENTION

Accordingly, one object of the present invention is to address the above-noted and other drawbacks.

Another object of the present invention is to provide a mobile terminal and corresponding keypad control method for adjusting the size of a keypad by using a zoom in/out function.

Yet another object of the present invention is to provide a mobile terminal and corresponding keypad control method for controlling an activation/deactivation of a scroll function according to a change in the size of a keypad and a display region.

Still another object of the present invention is to provide a mobile terminal and corresponding keypad control method for displaying a desired row of a keypad by using a scroll function.

To achieve these and other advantages and in accordance with the purpose of the present invention, as embodied and broadly described herein, the present invention provides in one aspect a mobile terminal including a display unit configured to display a keypad in a second display region and data input from at least the keypad in a first display region, and a controller configured to determine if the keypad displayed in its current form is to be displayed in a new different form, determine if all of the keypad in the new different form can be displayed to fit within the second display region, and to selectively control the display unit to display a scrolling function for scrolling the keypad displayed in the new different form when all of the keypad can not be displayed to fit within the second display region.

In another aspect, the present invention provides a method of controlling a mobile terminal, which includes displaying a keypad in a second display region and data input from at least the keypad in a first display region, determining if the keypad displayed in its current form is to be displayed in a new different form, determining if all of the keypad in the new different form can be displayed to fit within the second display region, and selectively displaying a scrolling function for scrolling the keypad displayed in the new different form when all of the keypad can not be displayed to fit within the second display region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 7A to 7D are overviews of display screens illustrating a method of changing the size of a keypad of the mobile terminal according to one embodiment of the present invention;

DETAILED DESCRIPTION OF THE INVENTION

Reference will now be made in detail to the preferred embodiments of the present invention, examples of which are illustrated in the accompanying drawings.

Figure 1:
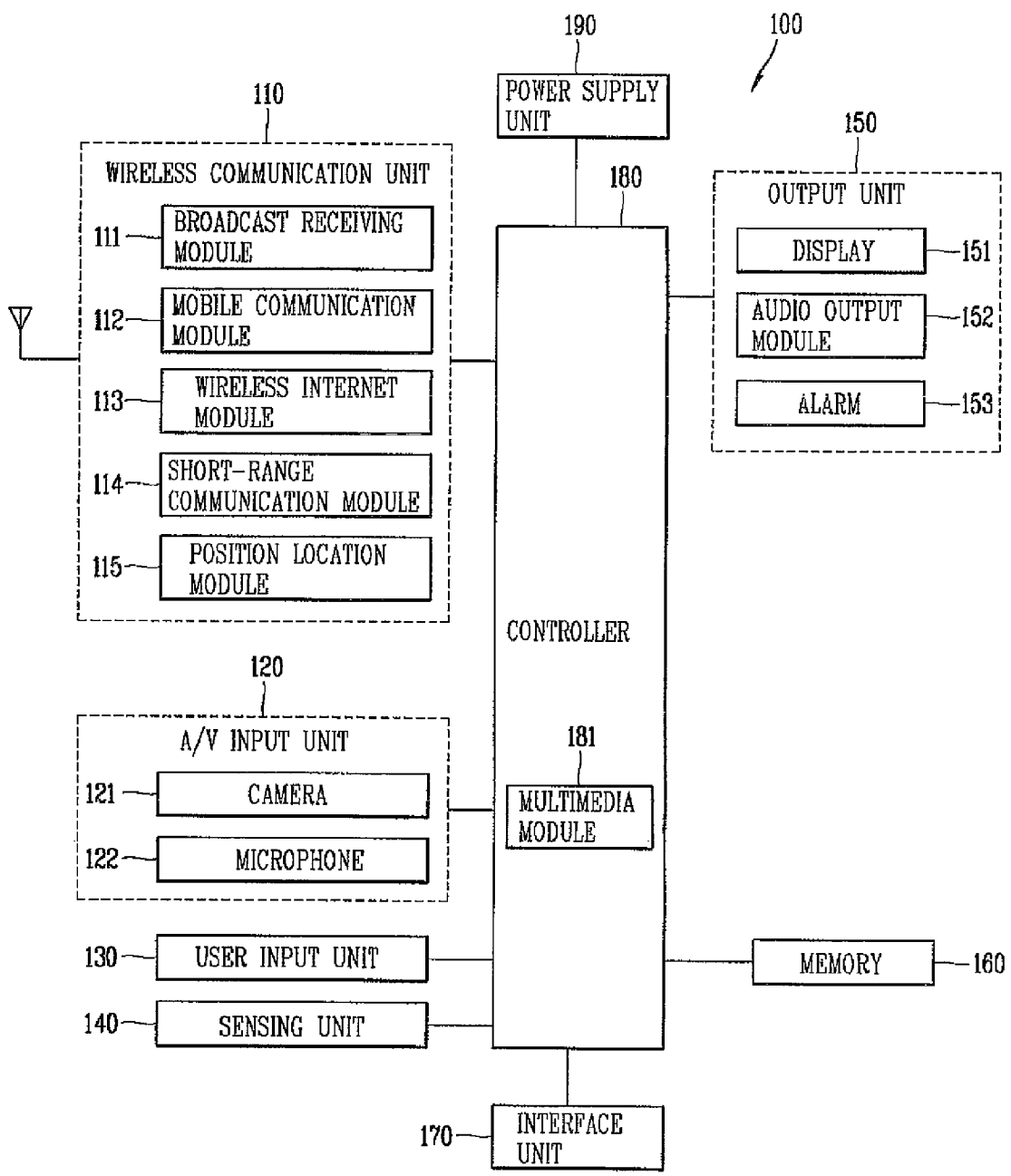
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal 100 is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system that transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal 100. The module 113 may be internally or externally coupled to the terminal 100. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components that cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed.

Other examples include the sensing unit 140 sensing the presence or absence of power provided by a power supply 190, the presence or absence of a coupling or other connection between an interface unit 170 and an external device, etc.

Further, the interface unit 170 may be implemented to couple the mobile terminal 100 with external devices. Examples of external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 may also include various components that support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 that supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Figure 2:
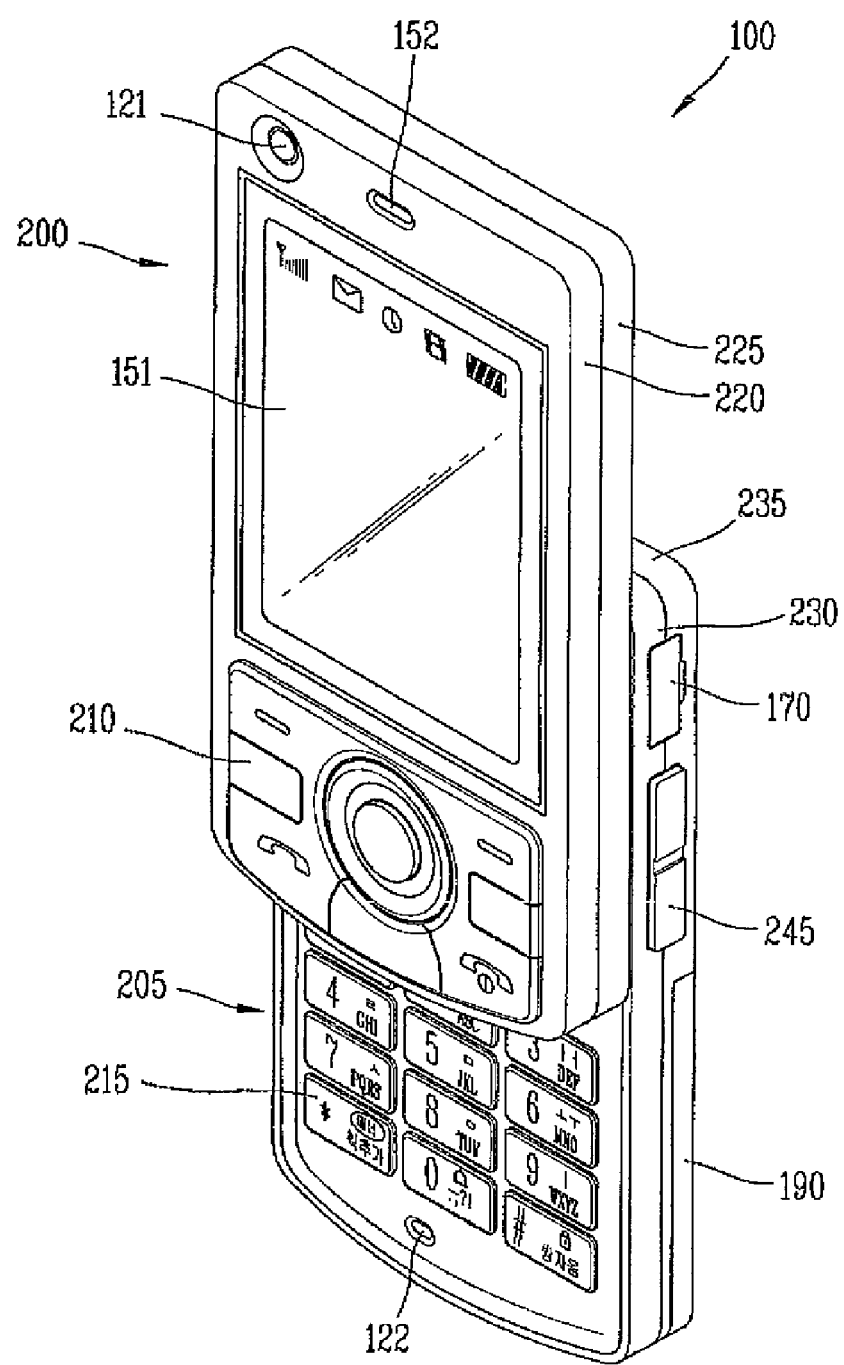
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, the user can access the keypad 215, as well as the display 151 and function keys 210. The function keys 210 are convenient to a user for entering commands such as start, stop and scrolling commands.

Further, the mobile terminal 100 is operable in either a standby mode (e.g., able to receive a call or message, receive and respond to network control signaling), or an active call mode. Generally, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridged material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
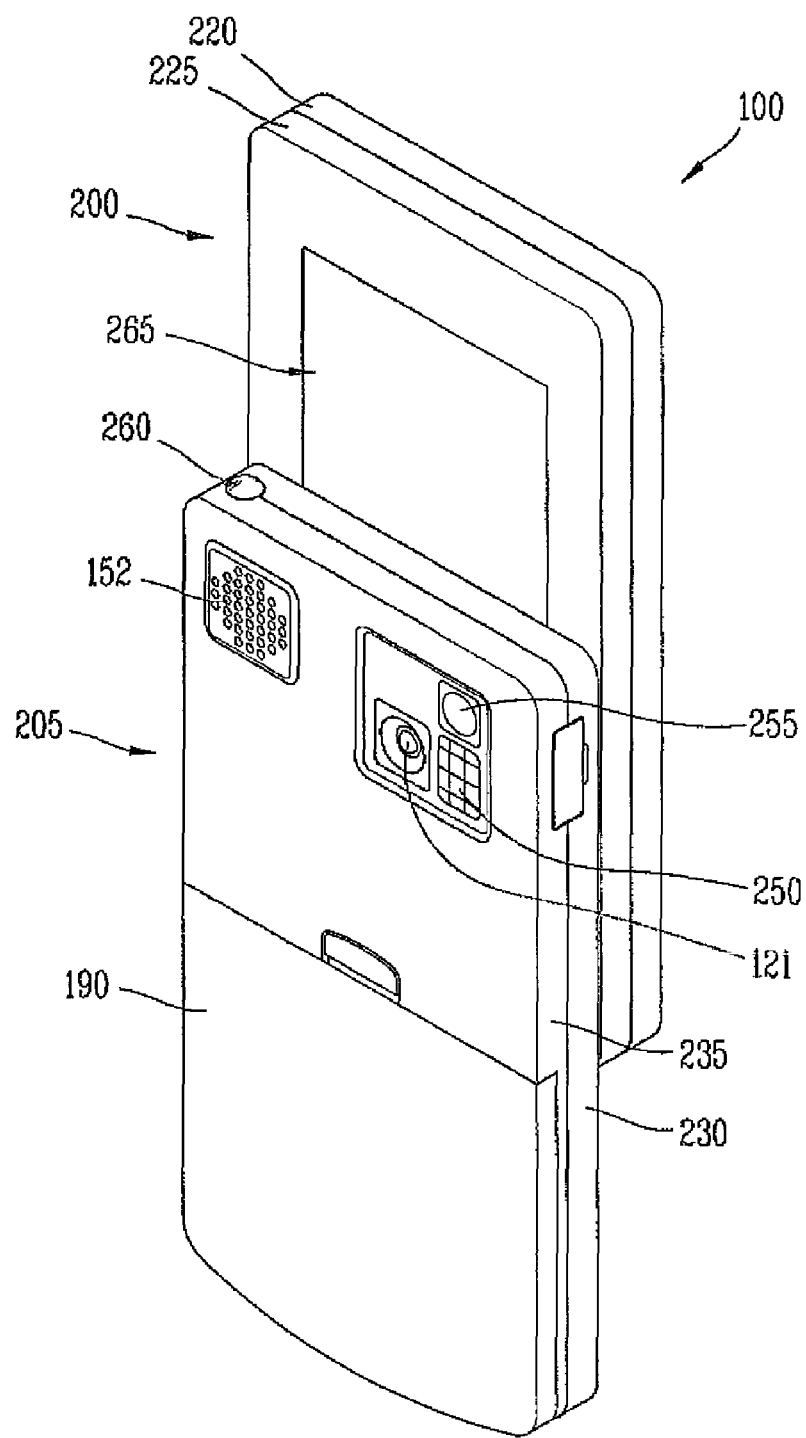
FIG. 3 is a rear perspective view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). Further, the antenna 260 may be fixed or configured to retract into the second body 205. Also, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system that transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
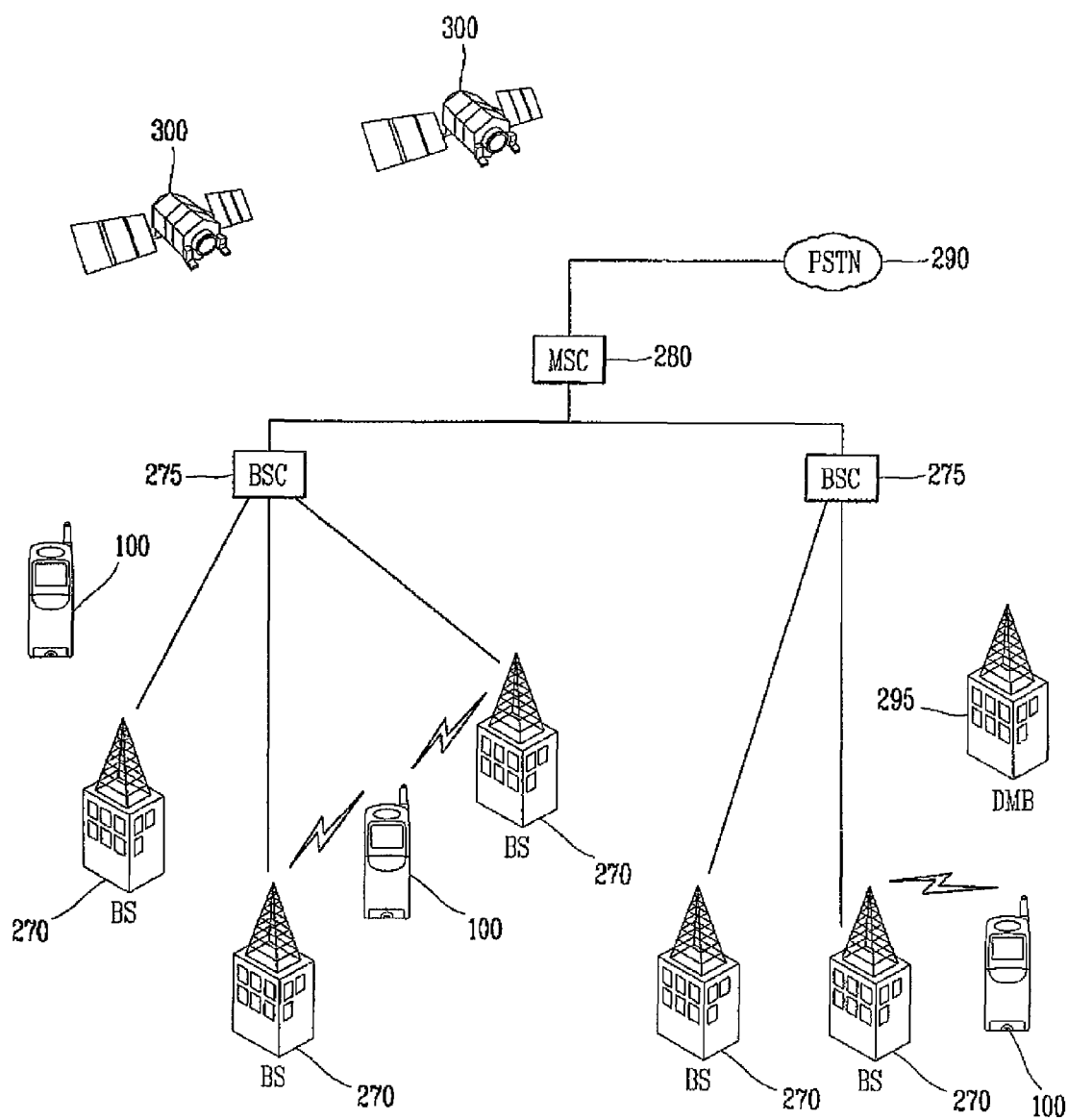
FIG. 4 is a block diagram of a CDMA wireless communication system operable with the mobile terminal of FIGS. 1-3.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during general operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

The functions and operations of the display unit 151 and the controller 180 constituting the mobile terminal according to an embodiment of the present invention will now be described in more detail. Further, the display unit 151 may display a state or results according to an operation of the mobile terminal 100 and as discussed above may be implemented in the form of a touch screen.

In addition, the entire screen of the display unit 151 may include one or more display regions. In the present embodiment, the entire screen of the display unit 151 is divided into first and second display regions, and a keypad is displayed on one of the first and second display regions. Also, the state, results, and various information according to input data generated from the user input unit 130 are displayed on the other display region.

Further, the keypad includes a plurality of keys on which one or more of characters, numbers, and symbols are defined, and may be implemented as an image or in the form of an icon on the screen of the display unit 151. The format of the keypad may be implemented as one of Hirakana, Katakana, Korean-Hangul 2 (KSC-5715), Korean-Hangul 3, Qwerty, Dvorak, QWERTZ, AZERTY, QZERTY In addition, the controller 180 readjusts the size of the keypad and a display region according to a user instruction input via the display unit 151, and activates or deactivates a scrolling function according to the readjusted size of the keypad and/or the display region. In other words, the controller 180 displays or releases a scroll unit according to the size of the keypad and/or the display region.

Also, when the user moves the boundary between the first and second display regions through a dragging operation, the controller 180 readjusts the size of the keypad and/or the display region in proportion to a movement distance of the boundary. If the readjusted display region is reduced to be smaller than a certain size or if the size of the keypad exceeds a certain size, the controller 180 displays a scroll unit for scrolling the keypad on the display unit 151.

In addition, the certain size is a minimum size of the display region in which all the keys of the keypad can be displayed or a maximum size in which all the keys of the keypad may be aligned and displayed. Further, the certain size can be set by the user or determined as a default.

In addition, when the user performs a dragging operation on the display region on which the keypad is displayed, the controller 180 adjusts the size of the keypad at a certain rate whenever the dragging operation is performed. For example, whenever a dragging operation in a clockwise direction is detected, the controller 180 increases or magnifies the size of the keypad at a rate of 110 percent, and whenever a dragging operation in a counterclockwise is detected, the controller 180 reduces the size of the keypad at a rate of 90 percent.

In other words, if the size of the keypad is 640×480 pixels, if a single dragging operation in a clockwise direction is detected, the controller 180 readjusts the size of the keypad into 704×528 pixels, namely, 110 percent of the current size of the keypad. In addition, the controller 180 may set information related to the activation/deactivation of a keypad increase/reduction function, the size of the keypad, the activation/deactivation of the scroll function, and the like.

The size of the keypad may also be arbitrarily set by the user or any previously defined keypad size may be selected. Further, when the scrolling function is set and a display region allocated to display the keypad and/or the size of the keypad are changed, the controller 180 activates or deactivates the scrolling function according to the changed display region or the size of the keypad.

When the scrolling function is activated, the controller 180 scrolls the keypad according to manipulation of a scroll unit, and displays a corresponding row of the keypad according to the scroll operation. The controller 180 displays one or more of a plurality of rows of the keypad, and scrolls one or more rows in a vertical and/or horizontal directions at a single scrolling operation. In addition, when the scrolling function is released, the controller 180 displays the entire keypad (i.e., every row of the keypad) on the allocated display region of the display unit 151.

Figure 5:
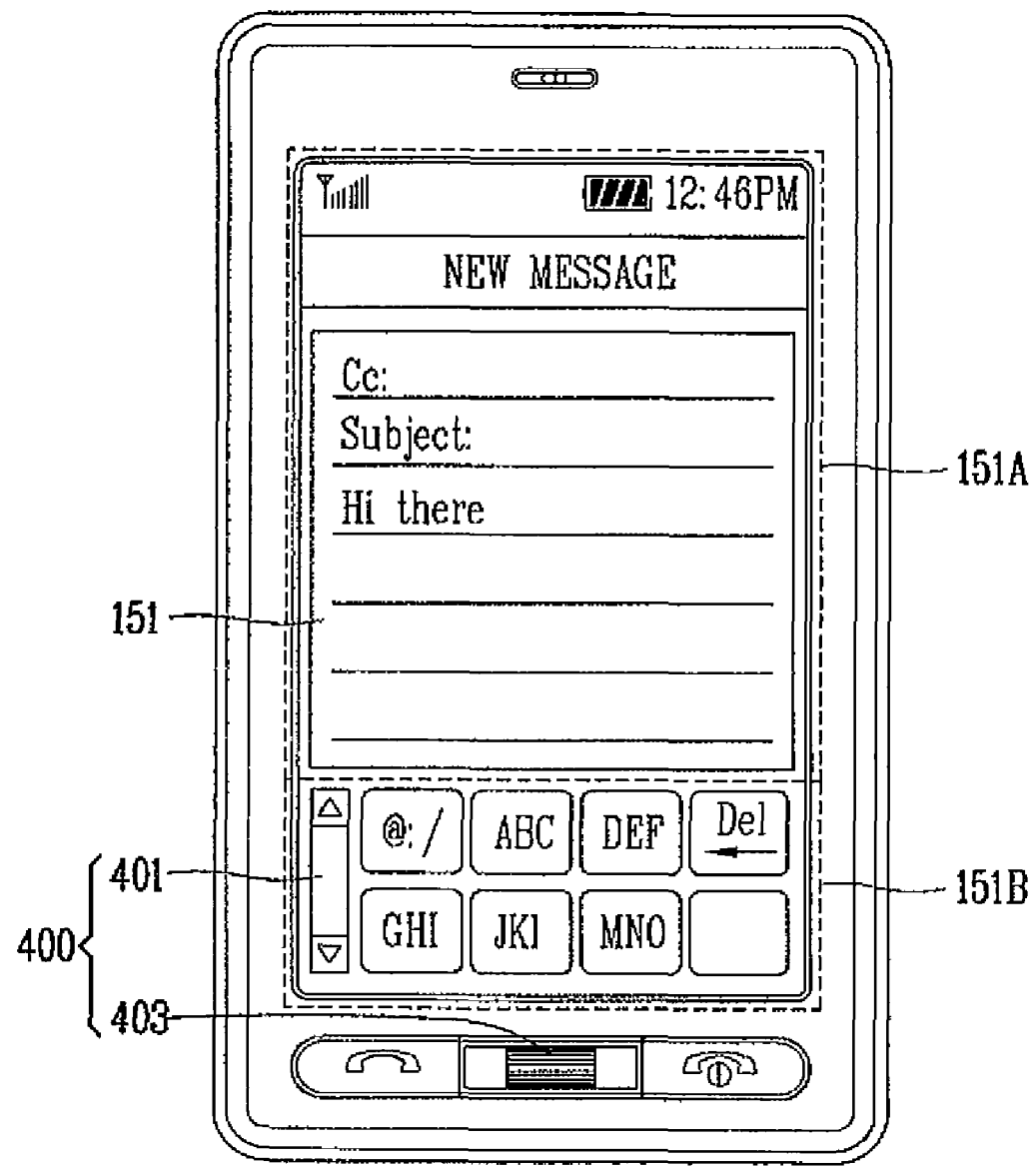
FIG. 5 is an overview of a display screen of a mobile terminal according to one embodiment of the present invention.

Next, FIG. 5 is an overview of a display screen configuration of a mobile terminal according to one embodiment of the present invention. FIG, 1 will also be referred to in the description of the rest of the figures.

As shown in FIG. 5, the display unit includes a first display region 151A that displays information 151 such as an image, video, text and state information, and a second display region 151B that displays a keypad and/or a scroll unit 400. Further, the second display region 151B may be disposed to be overlaid on the first display region 151A. The controller 180 can also display the keypad on the second display region 151B as being transparent or can provide the keypad in a pop-up manner.

As shown in FIG. 5, the scroll unit 400 includes a horizontal/vertical scroll bar 401 and/or a scroll button 403, etc., that may be implemented by software or hardware. Further, the'scroll unit 400 may be displayed on the second display region 151B of the display unit 151 together with the keypad, or may be mechanically implemented, rather than being visually displayed on the screen of the display unit 151.

In addition, when the scroll unit 400 is displayed together with the keypad, the scroll unit 400 and the keypad may be displayed to be overlaid or the scroll unit 400 or may be disposed on at least one side of upper/lower and left/right portions of the keypad. Also, the scroll unit 400 may be mechanically disposed on at least one side, front or rear surface of the mobile terminal 100, and may be implemented in the form of a scroll key, a navigation key, a wheel, or the like.

The scroll unit 400 may also be implemented to be combined with a function key that easily and quickly calls and executes a predefined function such as a hot key (shortcut) or the like. Further, the scroll unit 400 may be implemented as a proximity sensor such that when a pointing mechanism such as the user's finger or a stylus approaches in a particular direction, the controller 180 senses the direction via the proximity sensor and scrolls the displayed information in the same or similar corresponding direction.

In addition, the proximity sensor is a switch that detects an object that approaches a detect surface of the sensor or presence or absence of an object within a certain distance by using the force of an electromagnetic field without a mechanical contact. The proximity sensor is also called a proximity switch.

In addition, rather than the transmission of an ON/OUT output via a mechanical contact, the proximity switch transmits an ON/OFF output when the switch senses that an object comes within a particular distance determined by sensors without a mechanical contact. Thus, compared to a contact type switch, the proximity switch has a relatively long life span and has a high utilization.

Further, the operational principle of the proximity switch is that when the switch senses an object approaches a sensor detect surface while an oscillation circuit oscillates a positive RF, an oscillation amplitude of the oscillation circuit is attenuated or stopped, and such change is converted into an electrical signal to thereby detect or sense the object. Thus, the proximity switch can detect the object.

Figure 6:
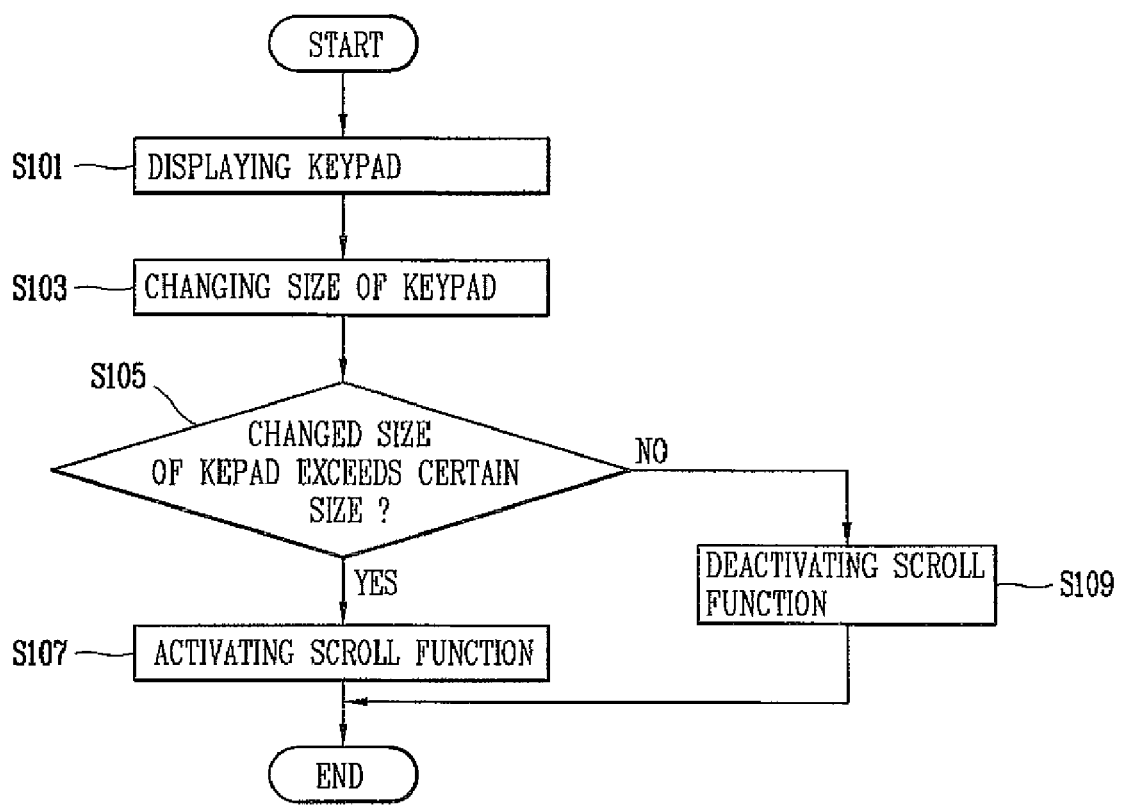
FIG. 6 is a flow chart illustrating a keypad control method for a mobile terminal according to one embodiment of the present invention.

Next, FIG. 6 is a flow chart illustrating a keypad control method of a mobile terminal according to one embodiment of the present invention. In this embodiment, the size of the keypad is adjusted by using a magnification/reduction function. In more detail, and as shown in FIG. 6, when a function such as creating a note or message that requires data input by the user is executed, the controller 180 displays the keypad on the second display region 151B of the display unit 151 (S101).

Thereafter, when the user inputs a control command or instruction for changing the size of the keypad, the controller 180 changes the size of the keypad according to the control command (S103). In this instance, because the size of the second display region 151B displaying the keypad is fixed, only the size of the keypad is changed (i.e., the keypad is magnified).

For example, if the user performs a touching and dragging operation in a certain direction on the second display region 151B, the controller 180 detects the touching and dragging operation and magnifies or reduces the size of the keypad at a certain rate. Subsequently the controller 180 checks whether the changed size of the keypad exceeds a certain size (S105). For example, the controller 180 checks whether the size of the keypad exceeds the size of the second display region 151B or a predetermined limit size.

If the size of the keypad exceeds the certain size (Yes in S105), the controller 180 activates the scroll function (S107). For example, if the size of the keypad exceeds the size of the second display region 151B, the controller 180 displays the scroll unit 400 together with the size-changed keypad on the second display region 151B.

Thereafter, if manipulation of the scroll unit 400 is detected, the controller 180 shifts at least one row and/or one column of the keypad according to the manipulation of the scroll unit 400. Meanwhile, if the size of the keypad does not exceed the certain size (No in step S105), the controller 180 displays the size-changed keypad on the second display region 151B and deactivates the scroll function (S109). In other words, because all of the keypad is displayed on the second display region 151B, the scroll unit 400 is not displayed.

FIGS. 7A to 7D are overviews of display screens illustrating a method of changing the size of a keypad of the mobile terminal according to one embodiment of the present invention. That is, FIGS. 7A to 7D illustrate changing the size of the keypad based on a touching and dragging operation.

Figure 7A:
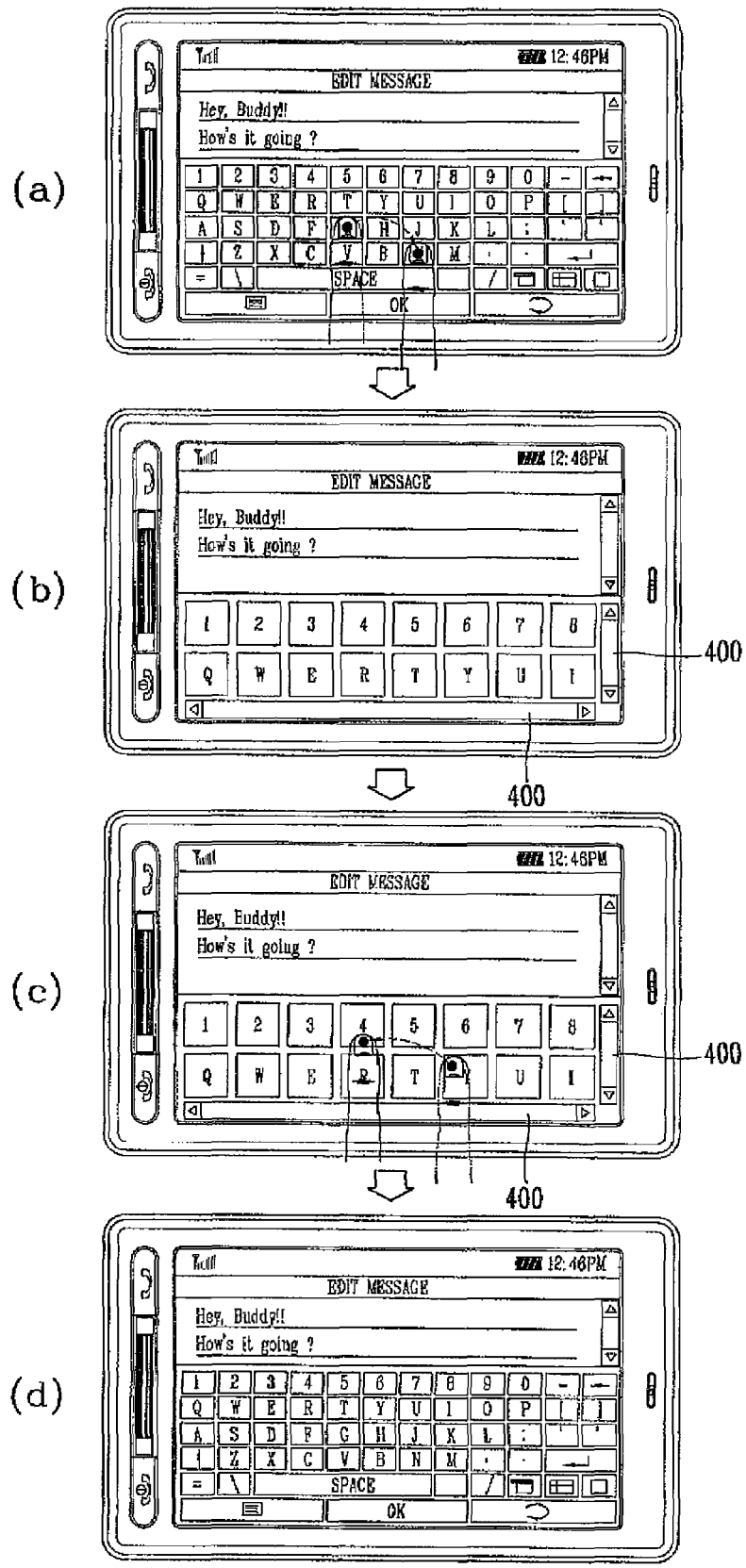

In more detail, FIG. 7A shows an example of changing the size of the keypad according to a touching and dragging operation performed in a clockwise/counterclockwise direction. As shown in FIG. 7A(a), when the user performs the touching and dragging operation in the clockwise direction, the controller 180 senses the dragging operation via the sensing unit 140. The controller 180 then magnifies the size of the keypad at a certain rate each time the touching and dragging operation is sensed.

Further, as discussed above, if the size of the magnified keypad exceeds the size of the second display region 151B, the controller 180 activates the scrolling function and displays the scroll unit 400 on the second display region 151B. FIG. 7A(b) illustrates the scroll unit 40 being displayed. Thereafter, as shown in FIG. 7A(c), if the user performs a touching and dragging operation in a counterclockwise direction, the controller 180 senses the touching and dragging operation via the sensing unit 140 and reduces the size of the keypad at a certain rate each time the dragging operation is sensed.

Further, if the size of the keypad is reduced to a size smaller than the size of the second display region 151B, the mobile terminal 100 deactivates the scroll function as shown in FIG. 7A(d). Thus, the scroll unit 400 displayed together with the keypad on the second display region 151B disappears from the second display region 151B of the display unit 151.

In addition, in one example, only the size of the keypad may be changed because the size of the second display region 151B is fixed. Alternatively the size of the second display region 151B may be changed together as the size of the keypad is changed. In addition, if the second display region 151B is increased, the first display region 151A is correspondingly reduced according to the increased area of the display region 151B. Also, it is preferable the first display region 151A has a sufficient display area allowing at least one line of data to be displayed therein. In addition, in FIG. 7A, the scroll unit 400 is implemented in the form of a scroll bar. However, the scroll unit 400 can include other various forms such as a scroll button, a scroll key, a wheel, a proximity sensor, and the like.

Figure 7B:
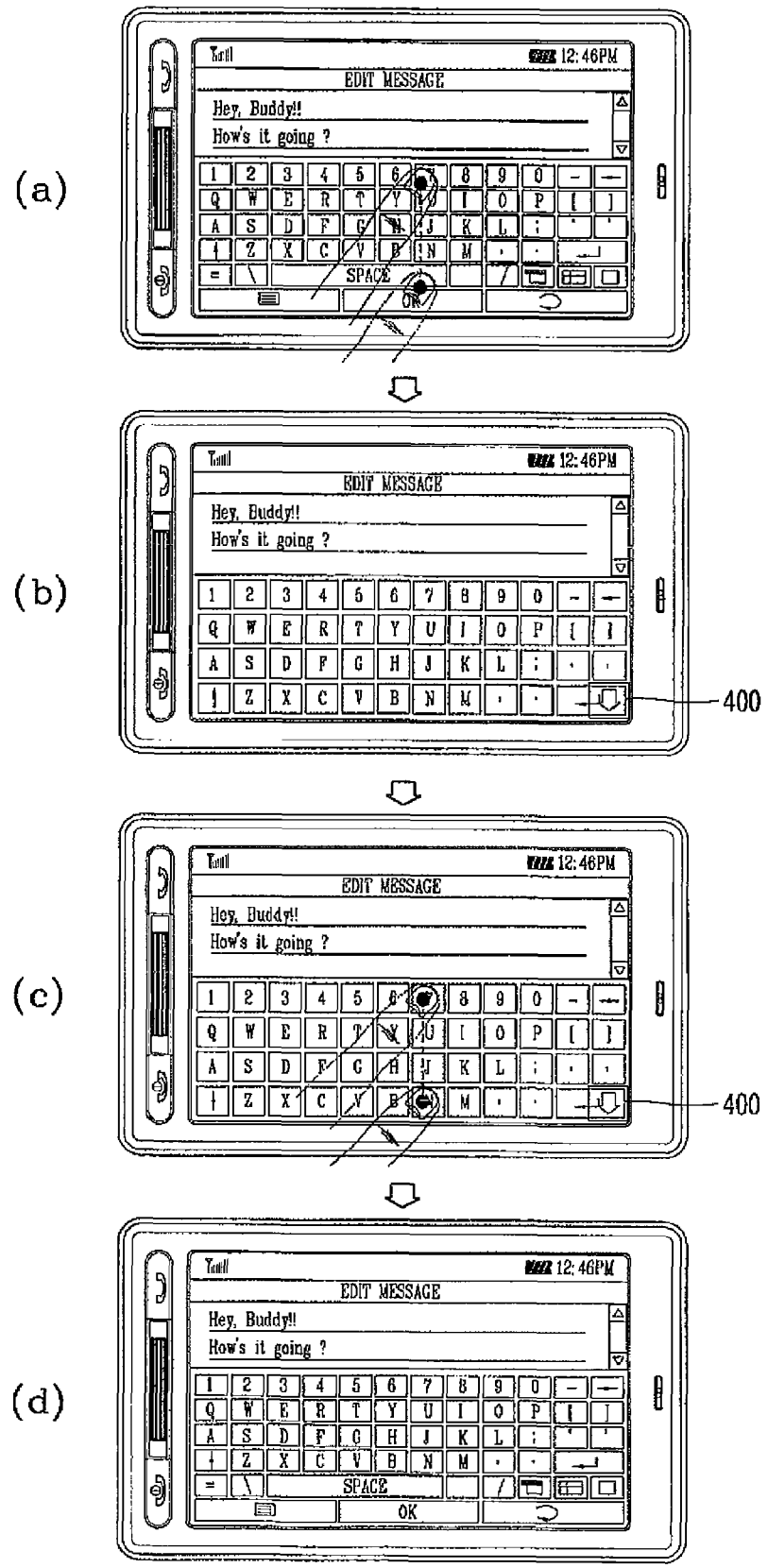

Next, FIG. 7B shows an example of changing the size of the keypad according to a touching and dragging operation performed in a vertical direction. As shown in FIG. 7B(a), when the user performs a touching and dragging operation in one direction, the controller 180 senses the operation via the sensing unit 140 and magnifies the size of the keypad in the same direction as the dragging direction at a certain rate each time the dragging operation is sensed. Here, the certain rate may be a pre-set value or may be determined according to a drag distance.

For example, if the user performs a dragging operation from the down to up direction (down→up), the controller 180 senses the operation and magnifies the size of the keypad in the vertical direction. Also, if the entirety of the magnified keypad cannot be displayed on the second display region 151B, the controller 180 activates the scroll function. FIGS.

7B(a) and 7B(b) illustrate the user performing the touching and dragging operation in the down→up direction.

Thereafter, as shown in FIGS. 7B(c) and 7B(d), if the user performs a dragging operation in the opposite direction, the controller 180 senses the operation and reduces the size of the keypad at a certain rate in the direction of the dragging. In other words, if the user performs the dragging operation from the up to down direction (up→down), the controller 180 senses the operation and reduces the size of the keypad in a vertical direction.

Further, the controller 180 compares the reduced size of the keypad and the size of the second display region 151B, and if the size of the keypad is smaller than the size of the second display region 151B, the controller 180 deactivates the scroll function. Also, this embodiment illustrates the user performing the touching and dragging operation in the vertical direction. However, the size of the keypad may be changed according to a touching and dragging operation performed in a horizontal direction. For example, if a touching and dragging operation from left to right (left→right) is sensed, the keypad is magnified in the horizontal direction at a certain rate, and if a touching and dragging operation from right to left (right→left) is sensed, the keypad is reduced in a horizontal direction at a certain rate.

Figure 7C:
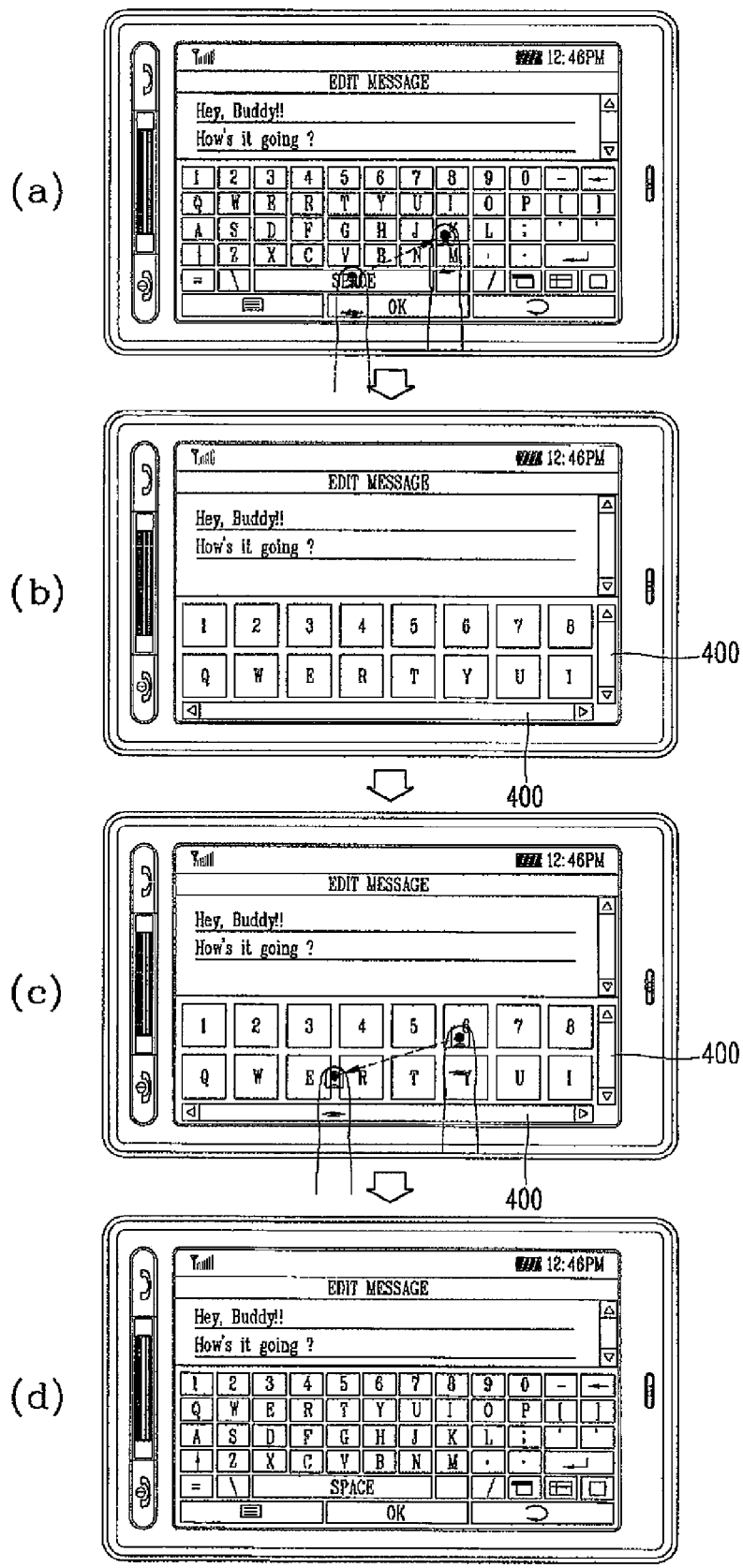

FIG. 7C shows an example of changing the size of the keypad according to a touching and dragging operation in a diagonal direction. As shown in FIG. 7C, when a touching and dragging operation is performed by the user, the controller 180 senses the dragging operation via the sensing unit 140 and changes the size of the keypad in the direction of the dragging.

In more detail, as shown in FIGS. 7C(a) and 7C(b), when the controller 180 senses the touching and dragging operation in a diagonal direction from a right upper end, the controller 180 magnifies the size of the keypad at a certain rate. As shown in FIGS. 7C(c) and 7C(d), when the controller 180 senses the touching and dragging operation in a diagonal direction from a left lower, the controller 180 reduces the size of the keypad at a certain rate. Again, the certain rate may be a pre-set value or may change according to a drag distance.

Further, in an alternative embodiment, the touching and dragging operations may also be performed from a left upper end to a right lower end to magnify the keypad, and may be performed from the right lower end to the left upper end to reduce the size of the keypad.

Next, FIG. 7D shows an example of changing the size of the keypad mechanically by using a wheel 405. In more detail, when the user selects a message creation menu to create a new message, the controller 180 displays a message creation screen image on the first display region 151A of the display unit 151 and simultaneously displays the keypad for text input on the second display region 151B.

Then, when the user manipulates the wheel 405 with the keypad displayed, the controller 180 changes the size of the keypad based on the direction of the wheel manipulation. That is, as shown in FIGS. 7D(a) and 7D(b), when the user manipulates the wheel 405 clockwise, the controller 180 magnifies the keypad. As shown in FIGS. 7D(e) and 7D(f), when the user manipulates the wheel 405 counterclockwise, the controller 180 reduces the size of the keypad. Further, the wheel 405 may serve as a navigation key (direction key) as well as a input unit for magnifying or reducing the keypad.

In addition, as shown in FIGS. 7D(b), (c), (d) and (e), when the size of the keypad is magnified, the controller 180 display a scroll button 405 at one side, an upper end or an upper portion of the keypad. Then, the user may scroll the keypad in a desired direction by touching the scroll button 405.

In addition, as discussed above, the keypad displayed on the display unit 151 may be scrolled by manipulating the wheel 405. For example, as shown in FIGS. 7D(b) and 7D(c), if a right portion of the wheel 405 is pressed to scroll the keypad in the right direction, the controller 180 scrolls the displayed keypad in the right direction. In other words, a portion of the keypad concealed at the right side is shifted in the left direction to appear on the screen of the display unit 151. Conversely, as shown in FIGS. 7D(d) and 7D(e), if the left side of the wheel 405 is pressed, a portion of the keypad concealed at the left side of the display unit 151 is shifted in the right direction to appear on the screen of the display unit 151.

Further, rather than using the scroll unit 400 implemented as the wheel 405, the scroll button 407, and the like, the scroll operation may be performed by performing a flicking or dragging operation or may be performed by tilting the mobile terminal 100 when the terminal 100 includes a tilt sensor.

Figure 8:
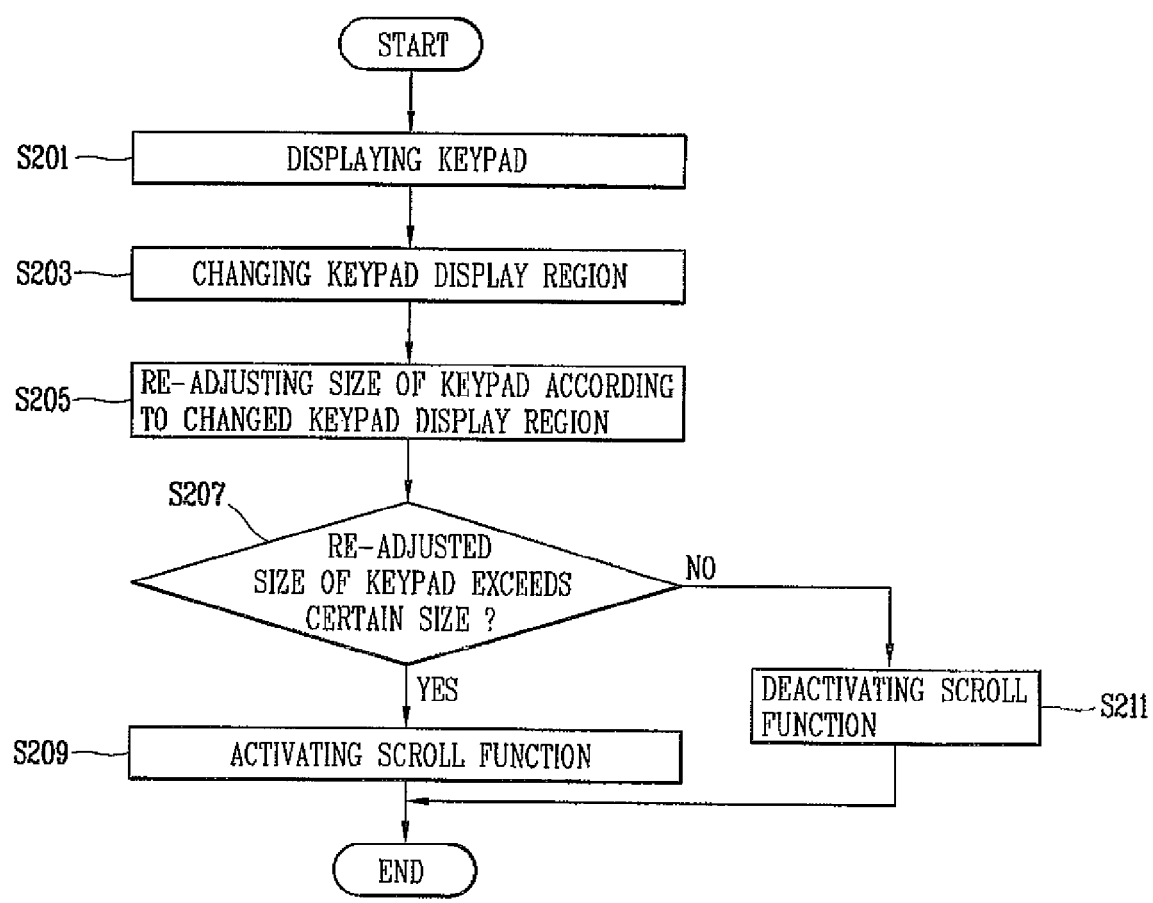
FIG. 8 is a flow chart illustrating a keypad control method of a mobile terminal according to another embodiment of the present invention.
Figure 9:
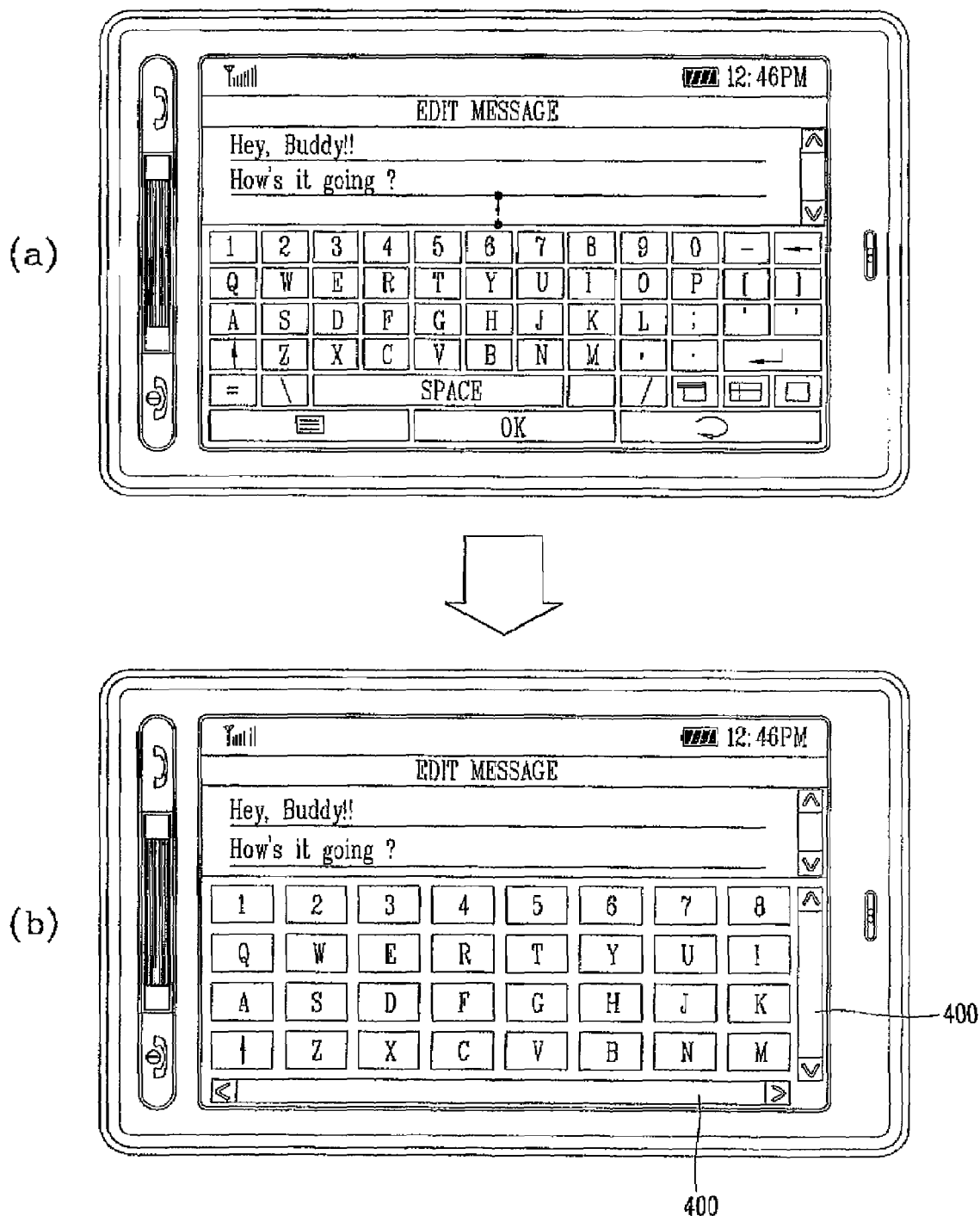
FIG. 9 is an overview of display screens illustrating a method of displaying keypads according to an embodiment of the present invention.

Next, FIG. 8 is a flow chart illustrating a keypad control method of a mobile terminal according to another embodiment of the present invention, and FIG. 9 is an overview of display screens illustrating a method of displaying keypads according to an embodiment of the present invention. In this embodiment, the size and region of the keypad is adjusted by adjusting the size of a display region of the keypad.

As shown in FIGS. 8 and 9(a), the controller 180 displays the Qwerty-based keypad (S201), and the user touches the boundary between the first and second display regions 151A and 151B and performs a dragging operation to move the boundary. At this time, the controller 180 detects the touching and dragging operation via the sensing unit 140 and changes the sizes of the first and second display regions 151A and 151B according to the movement of the boundary (S203). In other words, when the second display region 151B is magnified, the first display region 151A is relatively reduced, and when the second display region 151B is reduced, the first display region 151A is magnified.

The controller 180 also calculates a size change rate of the keypad based on the distance at which the boundary of the second display region 151B has been shifted, namely, based on the dragged distance. Then, the controller 180 readjusts the size of the keypad according to the calculated rate (S205).

If the readjusted size of the keypad exceeds a certain size (Yes in S205), the controller 180 activates the scroll function (S207, S209). For example, if the readjusted size of the keypad exceeds the certain size as shown in FIG. 9(b), the controller 180 displays the scroll unit 400 such as a scroll bar on the second display region 151B where the keypad is displayed.

However, if the readjusted size of the keypad is smaller than the certain size (No in step S207), the controller 180 changes the size of the keypad according to the calculated rate, displays the readjusted keypad on the second display region 151B, and deactivates the scroll function (S211).

Figure 10:
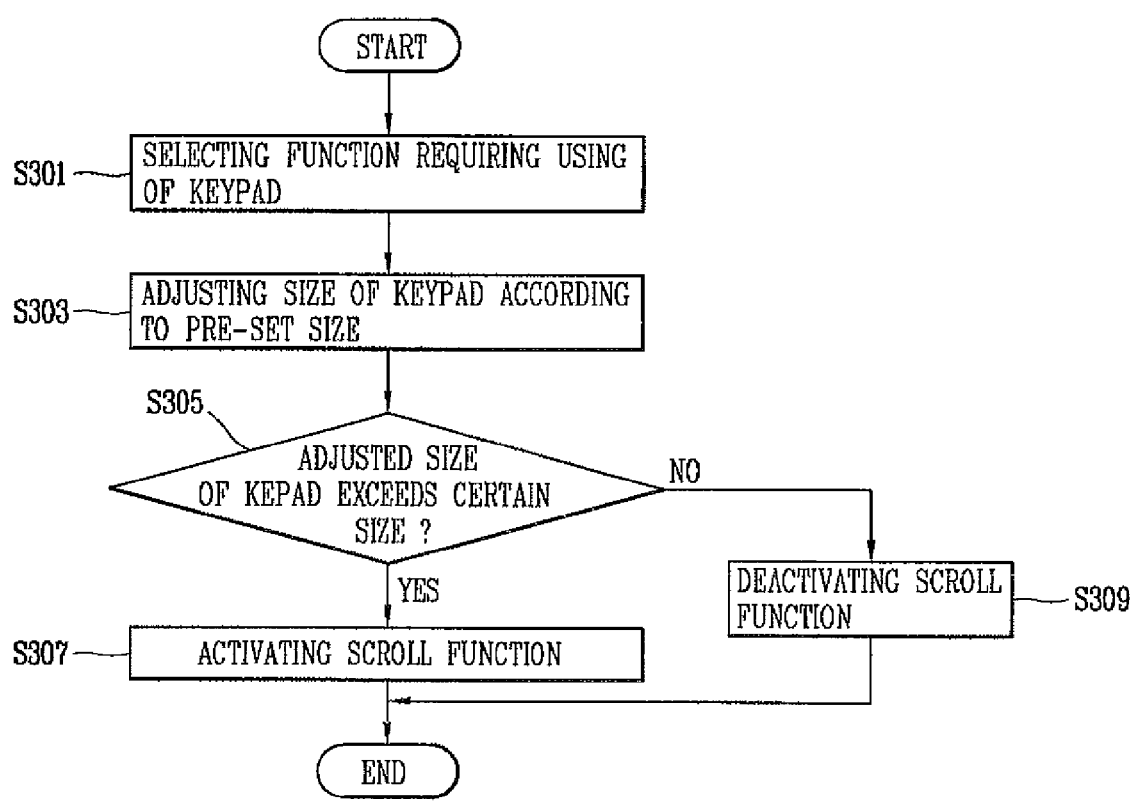
FIG. 10 is a flow chart illustrating a keypad control method of a mobile terminal according to still another embodiment of the present invention.
Figure 11:
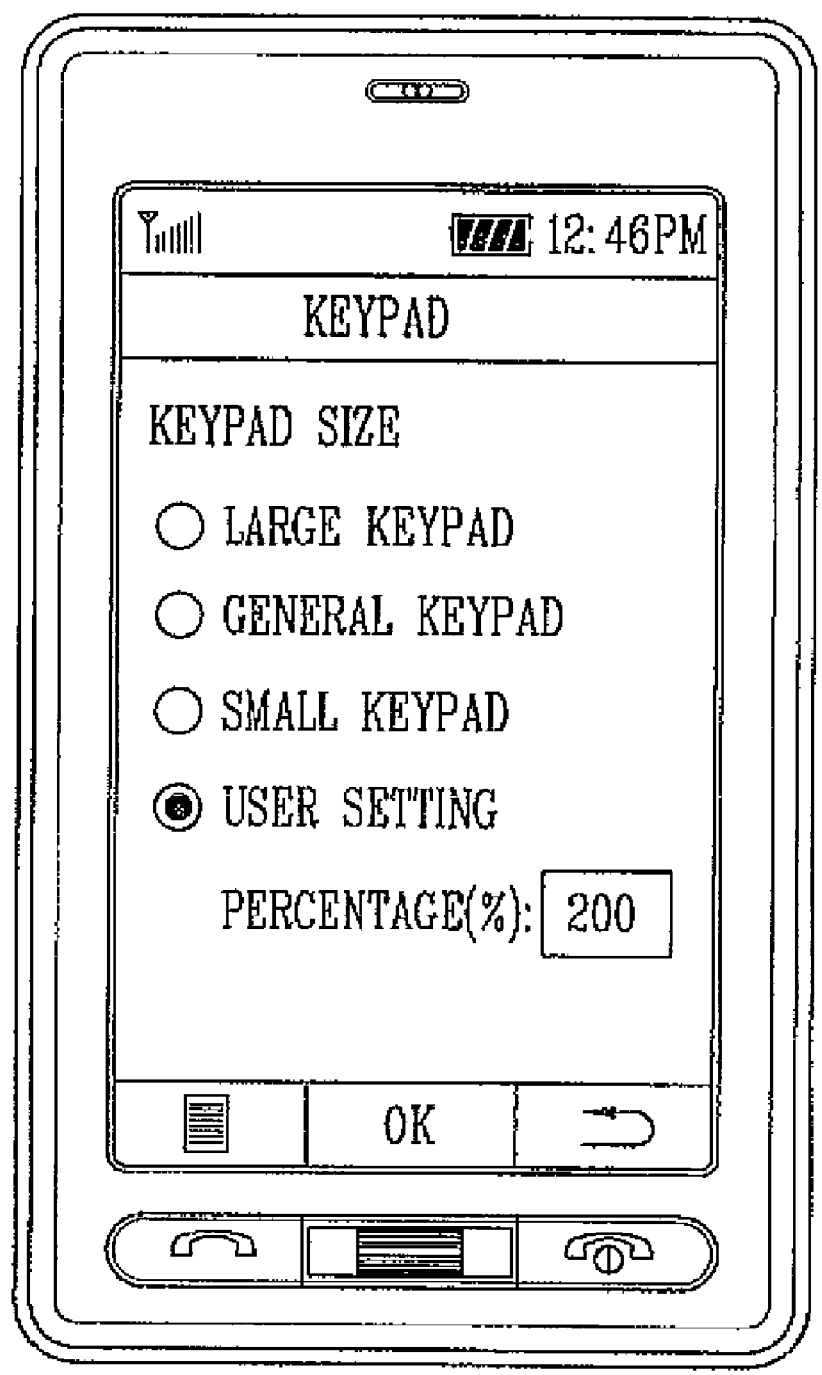
FIG. 11 is an overview of a display screen including a keypad size setting menu of a mobile terminal according to an embodiment of the present invention.

FIG. 10 is a flow chart illustrating a keypad control method according to still another embodiment of the present invention, and FIG. 11 is an overview of a display screen including a keypad size setting menu of a mobile terminal according to an embodiment of the present invention. In this embodiment, the controller 180 sets the size of the keypad based on a user menu.

In more detail, and as shown in FIG. 11, if the user executes a keypad environment setting function through menu manipulation, the controller 180 outputs a menu screen for setting a keypad environment to the display unit 151. Here, the user may select one of several items or input a rate to be arbitrarily changed. In other words, as shown in FIG. 11, if the user wants to double the size of the current keypad, the user may select a 'user setting' item and input 200% as a rate.

Thereafter, as shown in FIG. 8, if the user executes a function such as a message creation, a phone number registration, and the like, that requires using the keypad, the controller 180 changes the size of the keypad according to pre-set information through menu manipulation (S301, S303). In other words, the controller 180 changes the current size of the keypad according to the inputted keypad size change rate.

The controller 180 also checks whether or not the changed size of the keypad exceeds a certain size (S305), and if the changed size of the keypad exceeds the certain size (Yes in S305), the controller 180 activates the scroll function to display the scroll unit 40 on the second display region 151B (S307). If the changed size of the keypad is smaller than the certain size in step S305 (No in S305), the controller 180 displays the changed keypad on the second display region 151B of the display unit 151 and deactivates the scroll function (S309).

Figure 12:
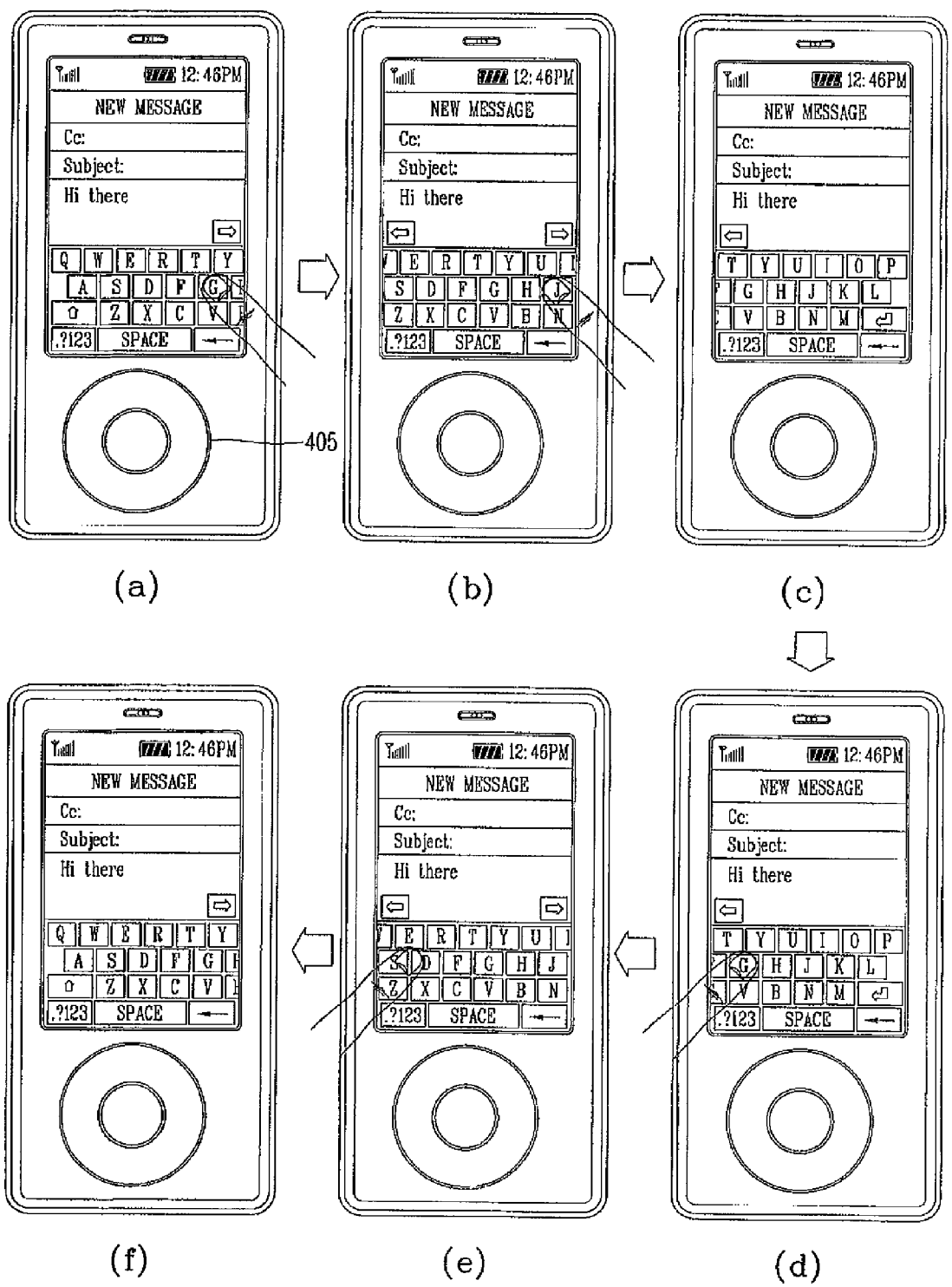
FIG. 12 is an overview of display screens for illustrating a method of manipulating scroll functions by using a proximity sensor in a mobile terminal according to an embodiment of the present invention.

Next, FIG. 12 is an overview of display screens for illustrating a method of manipulating scroll functions by using a proximity sensor in a mobile terminal according to an embodiment of the present invention. As shown in FIG. 12, with the scroll function activated, if the user approaches their finger in a scroll desired direction to scroll the keypad, the controller 180 senses the proximity of the user's finger via the sensing unit 140. The controller 180 also recognizes the direction in which the user's finger approaches, and scrolls the keypad displayed on the display unit 151.

For example, as shown in FIGS. 12(a)-(c), if the user's finger approaches the right side of the display region on which the keypad is displayed, the controller 180 shifts the keypad in the left direction to display a portion of the keypad concealed at the right side on the display unit 151. Further, while the proximity of the user's finger is sensed, the controller 180 maintains the scroll operation of the keypad, and if the proximity of the user's finger is not sensed, the controller 180 stops the scroll operation.

Namely, if the distance between a detect face of the proximity sensor and the user's finger is within a sensing available distance, the controller 180 performs the scrolling operation, and if the distance between the detect face of the proximity sensor and the user's finger exceeds the sensing available distance, the controller 180 stops the scrolling operation. FIGS. 12(d)-(f) illustrate the scrolling operation being performed in the other direction.

In addition, this particular embodiment illustrates the keypad being scrolled based on the direction in which proximity of an object is sensed. In an alternative embodiment, the wheel key 405 may be used to scroll the keypad. For example, if the wheel key 405 is manipulated in the rightward direction, the controller 180 scrolls the keypad from right to left, and if the wheel key 405 is manipulated in the leftward direction, the controller 180 scrolls the keypad from the left to the right.

Next, a method for controlling the scroll function according to the size of the display region in which the size of the keypad is fixed in the mobile terminal will be described. In more detail, FIG. 13 is a flow chart illustrating a keypad control method of a mobile terminal according to still another embodiment of the present invention, and FIG. 14 is an overview of display screens for illustrating a method of displaying a keypad of a mobile terminal according to an embodiment of the present invention.

Figure 13:
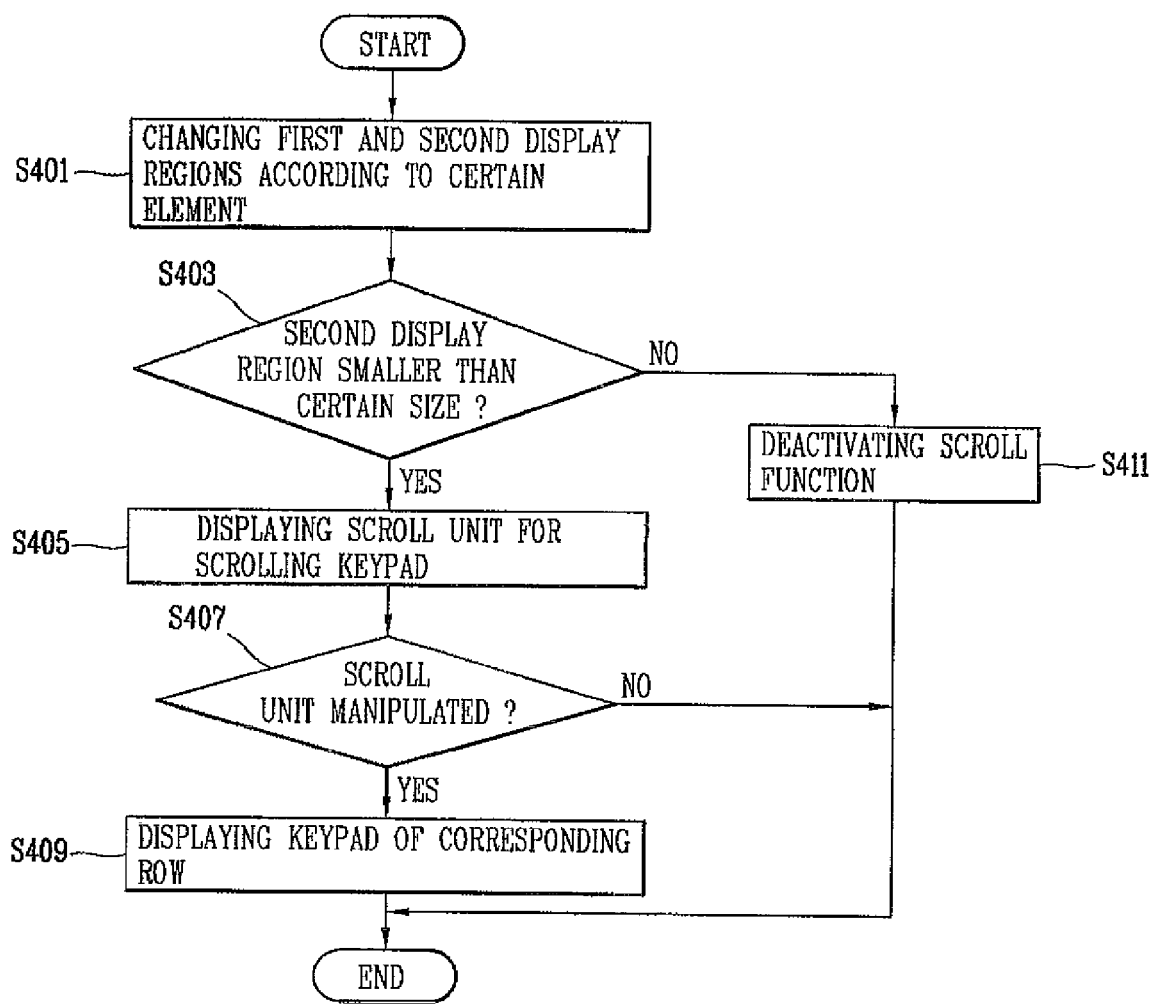
FIG. 13 is a flow chart illustrating a keypad control method of a mobile terminal according to still another embodiment of the present invention.
Figure 14:
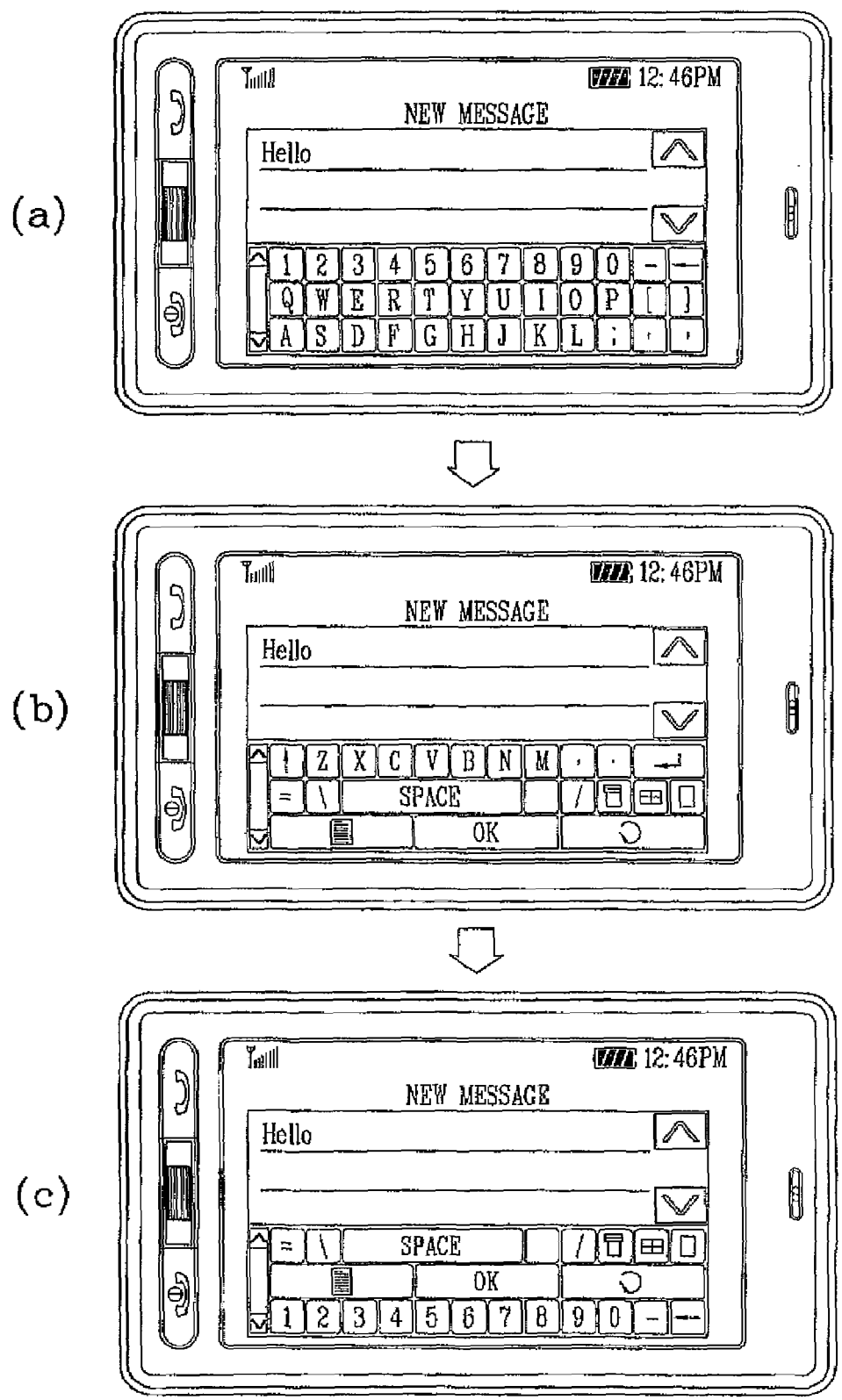
FIG. 14 is an overview of display screens for illustrating a method of displaying a keypad of a mobile terminal according to an embodiment of the present invention.

As shown in FIG. 13, the controller 180 detects a change in the first and second display regions 151A and 151B by a certain factor (S401). The certain factor can be set to determine whether or not to use the scroll function, and can be set through menu manipulation by the user. In addition, the certain factor can set to select a function that requires using of the keypad such as a 'memo' or 'sending message' function in a state that whether to use of the scroll function has been set. The certain factor can also be to shift the boundary between the first and second display regions 151A and 151B.

Alternatively, the certain factor can be to exceed a maximum amount of data that may be currently displayed on the first display region 151A. For example, when a maximum three rows can be currently displayed on the first display region 151A, if the three rows are filled with inputted data and a cursor moves to the next row, the controller 180 detects this operation and readjusts the first and second display regions 151A and 151B.

Further, if the detected second display region 151 B is smaller than a certain size, the controller 180 displays the keypad and the scroll unit 400 for scrolling the keypad on the second display region 151B (S403, S405). Here, the controller 180 readjusts the first and second display regions 151A and 151B, and the size and position of the keypad displayed on the second display region 151B to display only some rows of the keypad. In addition, the controller 180 controls the display unit 151 to display one or more rows among the plurality of rows of the keypad.

With the keypad and the scroll unit 400 displayed on the second display region 151 B, if the user performs a scrolling operation by touching the scroll unit 400 (Yes in S405), the sensing unit 140 senses the touch, generates a corresponding signal, and transfers the same to the controller 180 (S407). When the controller 180 scrolls the keypad by a certain row according to manipulation of the scroll unit 400, the controller 180 displays the scrolled keypad on the second display region 151B (S409). Further, the controller 180 scrolls such that one or more rows are scrolled at a time in a vertical or horizontal direction. In addition, the number of scrolled rows or the scroll speed may be determined according to the drag distance and speed.

For example, if the scrolling operation is performed in the vertical direction, a new row of the keypad appears at the lowermost portion of the second display region 151B, while the uppermost row disappears. When the last row of the keypad is scrolled, it is possible not to scroll the keypad or allow the first row of the keypad to appear after the final row of the keypad as shown in FIG. 14 by using the scroll unit while maintaining the scrolling operation.

In particular, FIGS. 14(a) and (b) illustrate the keypad being scrolled in an upward direction such that lower rows are the keypad are displayed. FIG. 14(c) illustrates a further scrolling operation to continue scrolling the keypad in the upward direction. The keypad can also be scrolled in the opposite direction using an upward scrolling operation.

If the second display region does not exceed the certain size (No in step S403), the controller 180 deactivates the scroll function (S411). Accordingly, the scroll unit 400 displayed on the second display region disappears and the use of the scroll unit 400 is stopped.

Figure 15:
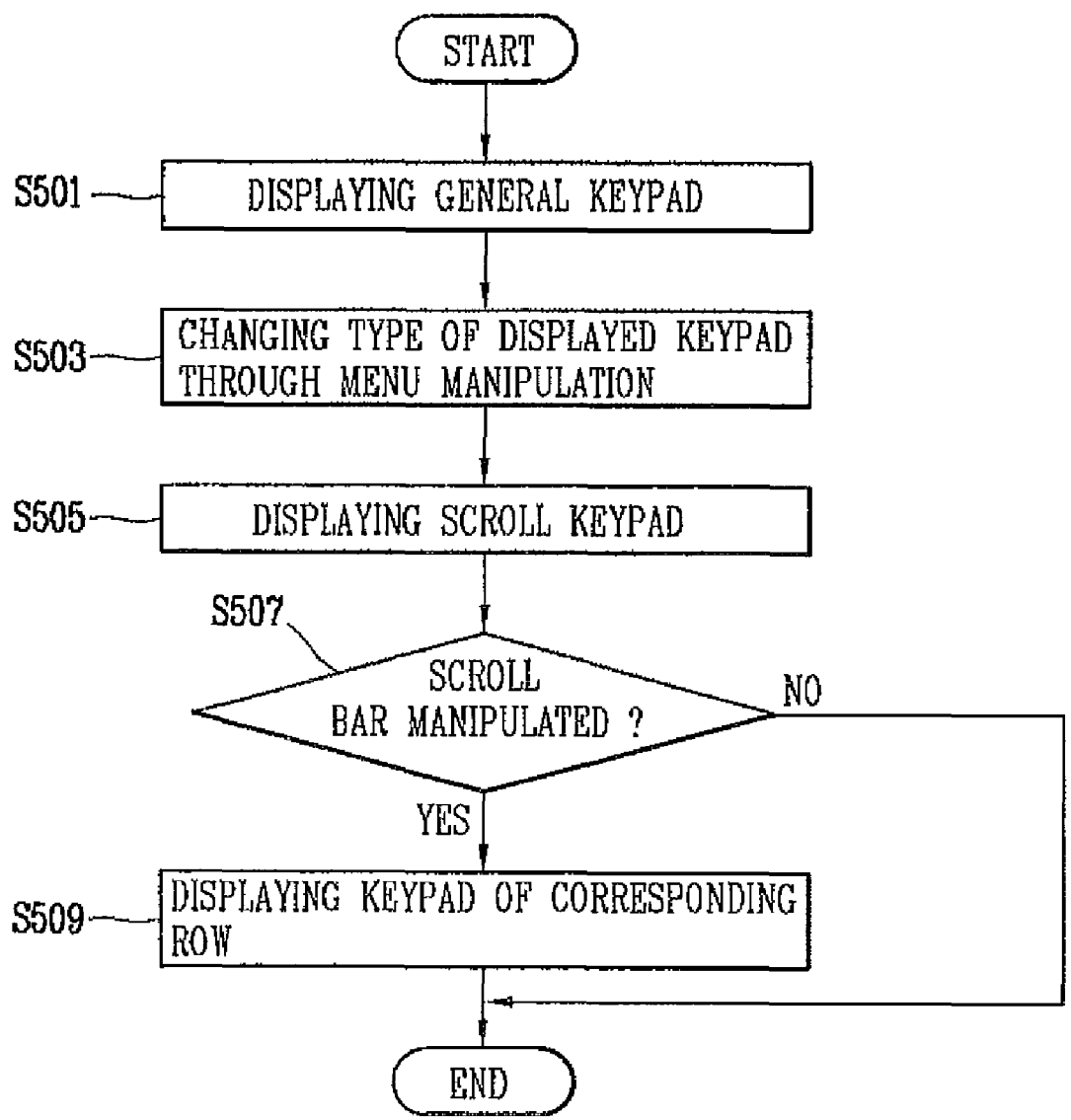
FIG. 15 is a flow chart illustrating a method of displaying a keypad of a mobile terminal according to an embodiment of the present invention.
Figure 16:
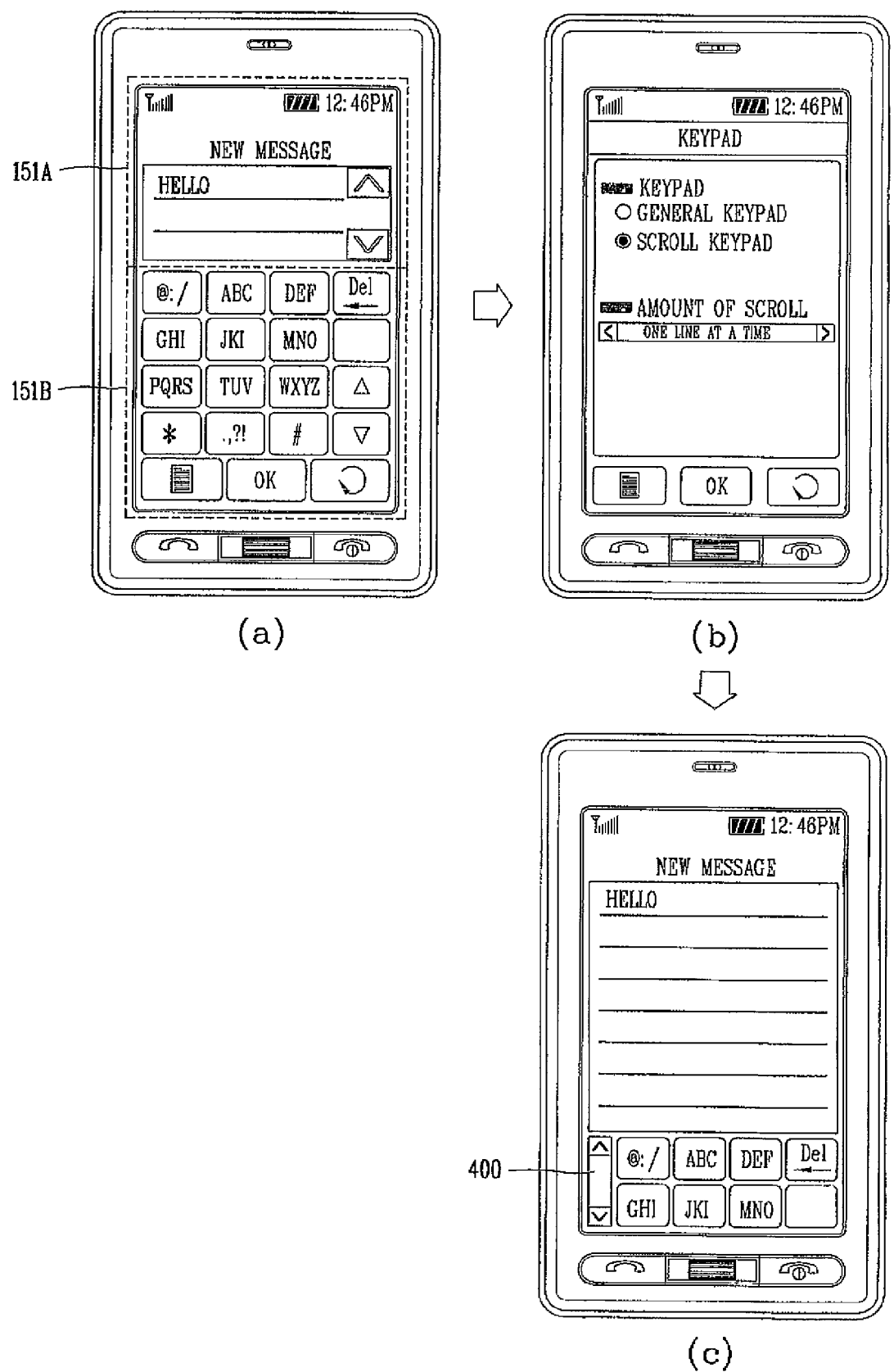
FIG. 16 is an overview of display screens for illustrating the method shown in FIG. 15 according to an embodiment of the present invention.

FIG. 15 is a flow chart illustrating a method of displaying a keypad of a mobile terminal according to an embodiment of the present invention, and FIG. 16 is an overview of display screens for illustrating the method shown in FIG. 15 according to an embodiment of the present invention. This embodiment uses a scroll bar as the scroll unit 400.

As shown in FIG. 15, the controller 180 first displays a general keypad on the second display region 151B (S510). FIG. 16(a) illustrates such a generally keypad. As shown in FIG. 16(a), the general keypad is a type of keypad that displays all the rows of the keypad. Then, the user manipulates a menu key to change the keypad type to a scroll keypad (S503).

FIG. 16(b) illustrates a menu option that the user can select to change the displayed type of keypad. Further, the scroll keypad is a type of the keypad that the scroll unit 400 and a certain row(s) of the keypad are displayed on the second display region 151B.

When the user has selected a keypad from the menu option shown in FIG. 16(b), the controller 180 readjusts the first and second display regions 151A and 151B according to the setting information, and adjusts the size and position of the keypad and corresponding scroll bar 400 (S505). FIG. 16(c) illustrates this feature. As shown in FIG. 16(c), the first display region 151A is magnified, the second display region 151B is reduced, and the scroll bar 400 and certain rows of the keypad are displayed on the second display region 151B. That is, two of the plurality of rows of the keypad are displayed. However, the number of displayed rows may be changed through menu manipulation by the user.

Then, if the scroll bar 401 displayed on the second display region is touched (Yes in S507), the controller 180 detects that a scrolling operation has occurred, and shifts the rows of the keypad by the scrolled amount according to manipulation of the scroll bar 401 and the display unit 151 displays the scrolled keypad on the second display region 151B (S509). Here, the number rows shifted by the single scrolling operation may be changed by the user through menu manipulation as shown in FIG. 16(b).

Figure 17:
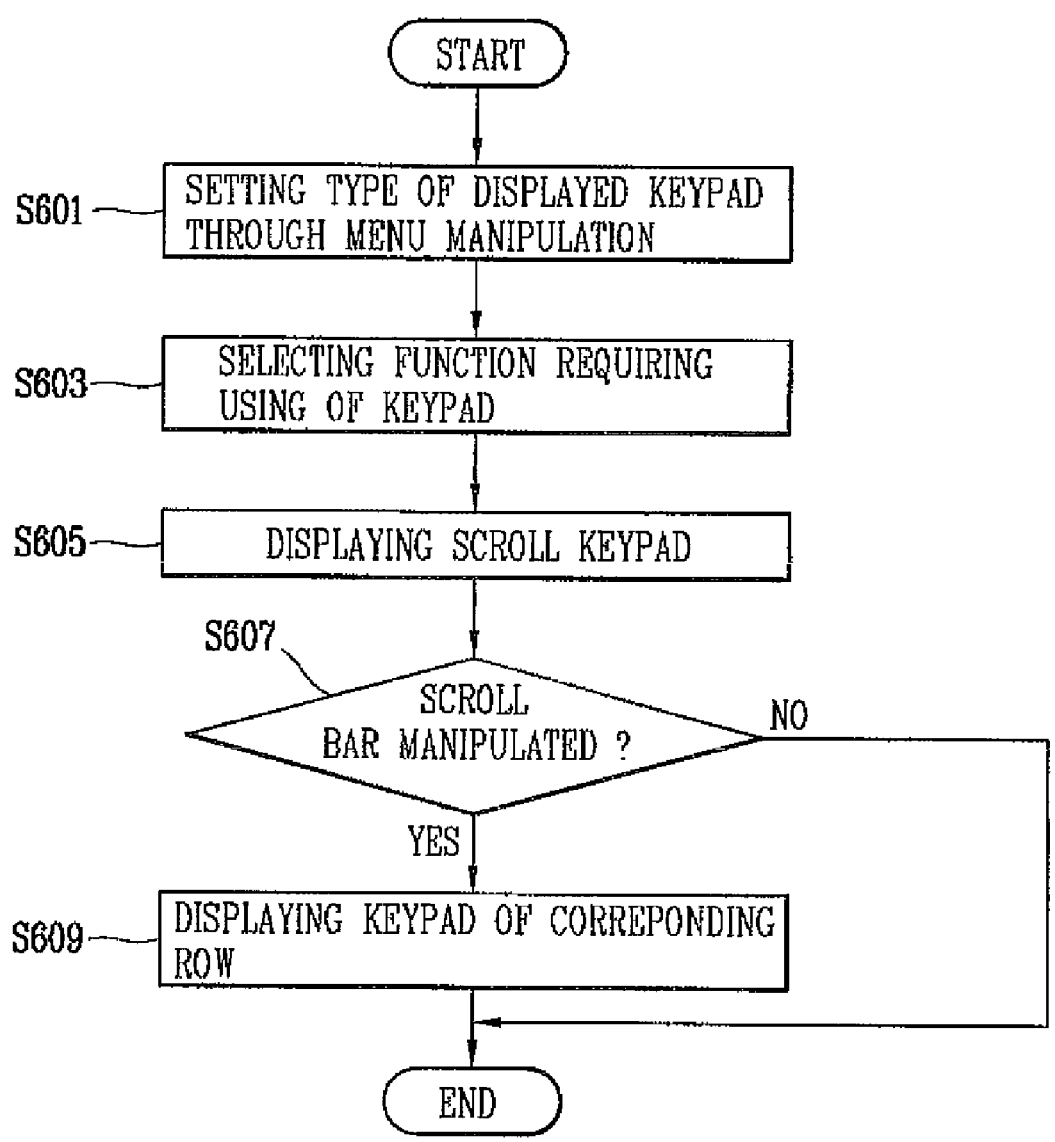
FIG. 17 is a flow chart illustrating a method of displaying a keypad of a mobile terminal according to another embodiment of the present invention.
Figure 18:
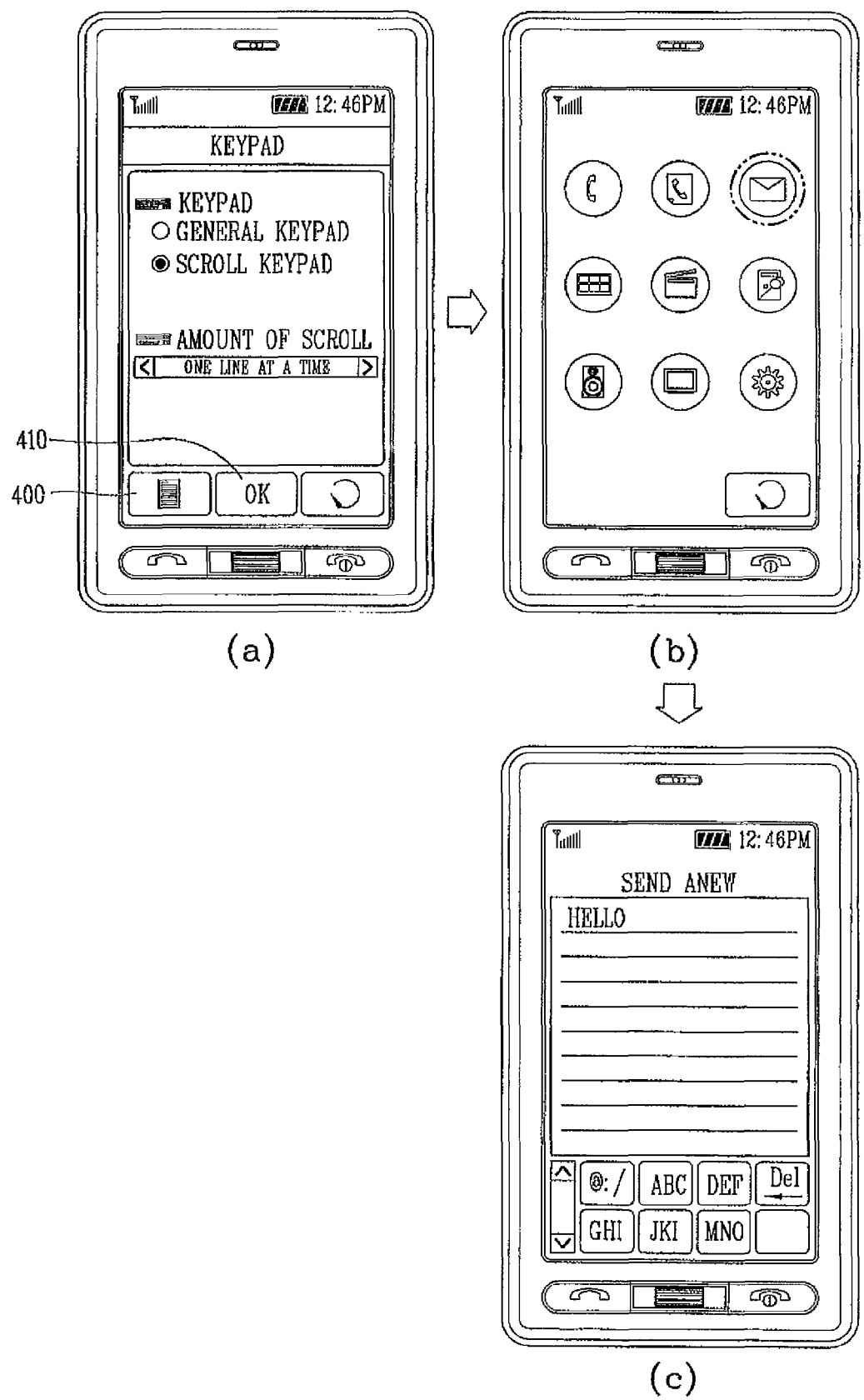
FIG. 18 is an overview of display screens for illustrating the method shown in FIG.17 according to an embodiment of the present invention.

FIG. 17 is a flow chart illustrating a method of displaying a keypad of a mobile terminal according to another embodiment of the present invention, and FIG. 18 is an overview of display screens for illustrating the method shown in FIG. 17 according to an embodiment of the present invention.

As shown in FIGS. 17 and 18(a), if the user sets the type of the keypad as the scroll keypad through menu manipulation on the setting screen image and touches the OK key 410, the controller 180 stores the changed set information in the memory 160 (S601). After the user selects the type of keypad, the controller 180 displays a main menu including a plurality of executable functions (see FIG. 18(b)). Thereafter, when the user selects a corresponding function that requires inputting of the keypad such as a 'memo' or 'sending message' function, the controller 180 executes the selected function (S603). FIG. 8(c) illustrates the sending message function along with the displayed scroll keypad.

The controller 180 then reads and checks the set information stored in the memory 160, and allocates the first and second display regions 151A and 151B on the entire screen of the display unit 151. Then, the controller displays the keypad and the scroll bar 401 on the second display region 151B (S605). In addition, if the user touches the scroll bar 401, a touch panel of the display unit 151 transmits the corresponding touch position information to the controller 180 (S607). The controller 180 then transmits a control signal corresponding to the position information to the display unit 151, and the display unit 151 displays a corresponding row by scrolling the keypad displayed on the second display region 151B according to the control signal (S609).

Figure 19:
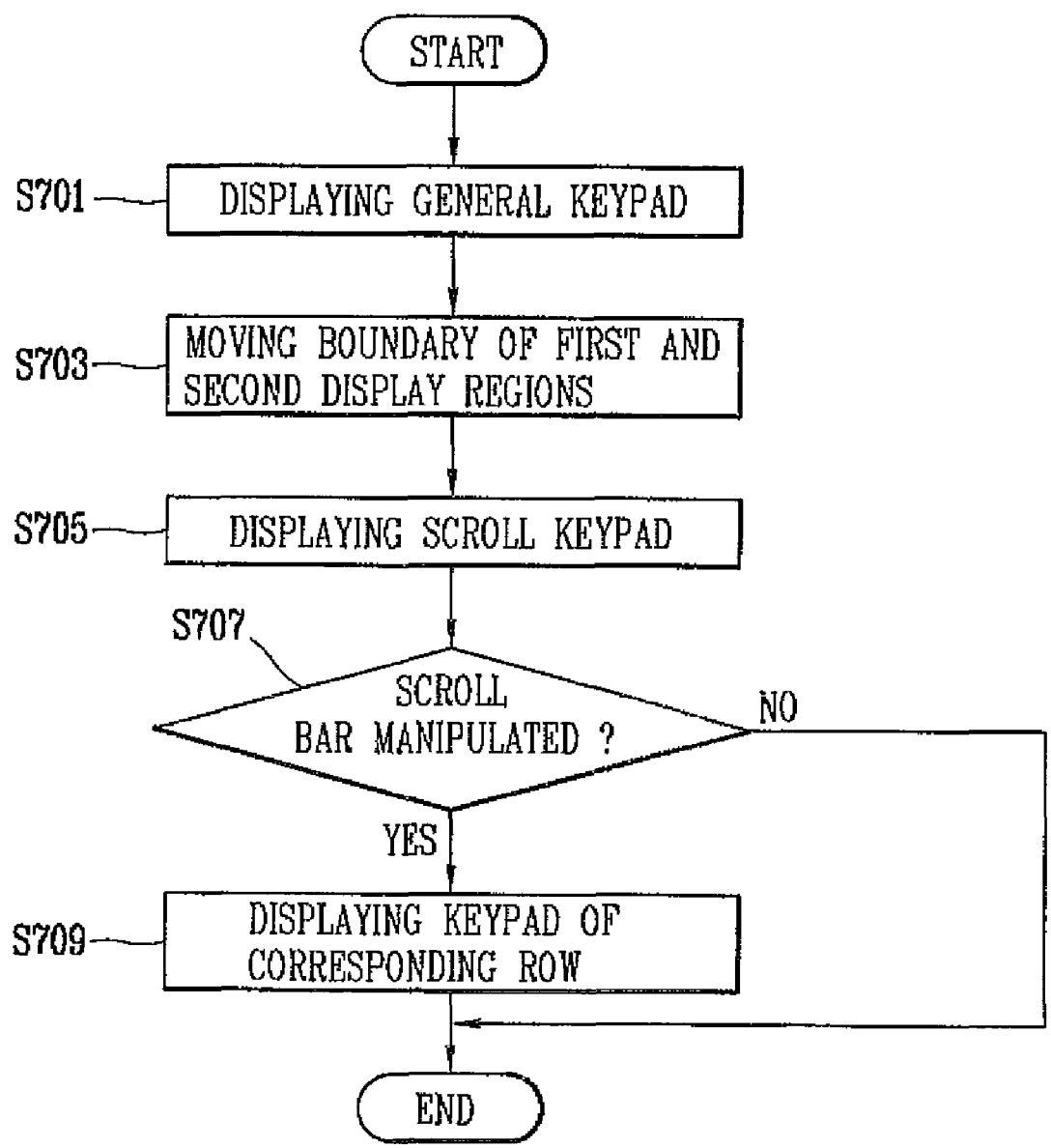
FIG. 19 is a flow chart illustrating a method of displaying a keypad of a mobile terminal according to another embodiment of the present invention.
Figure 20:
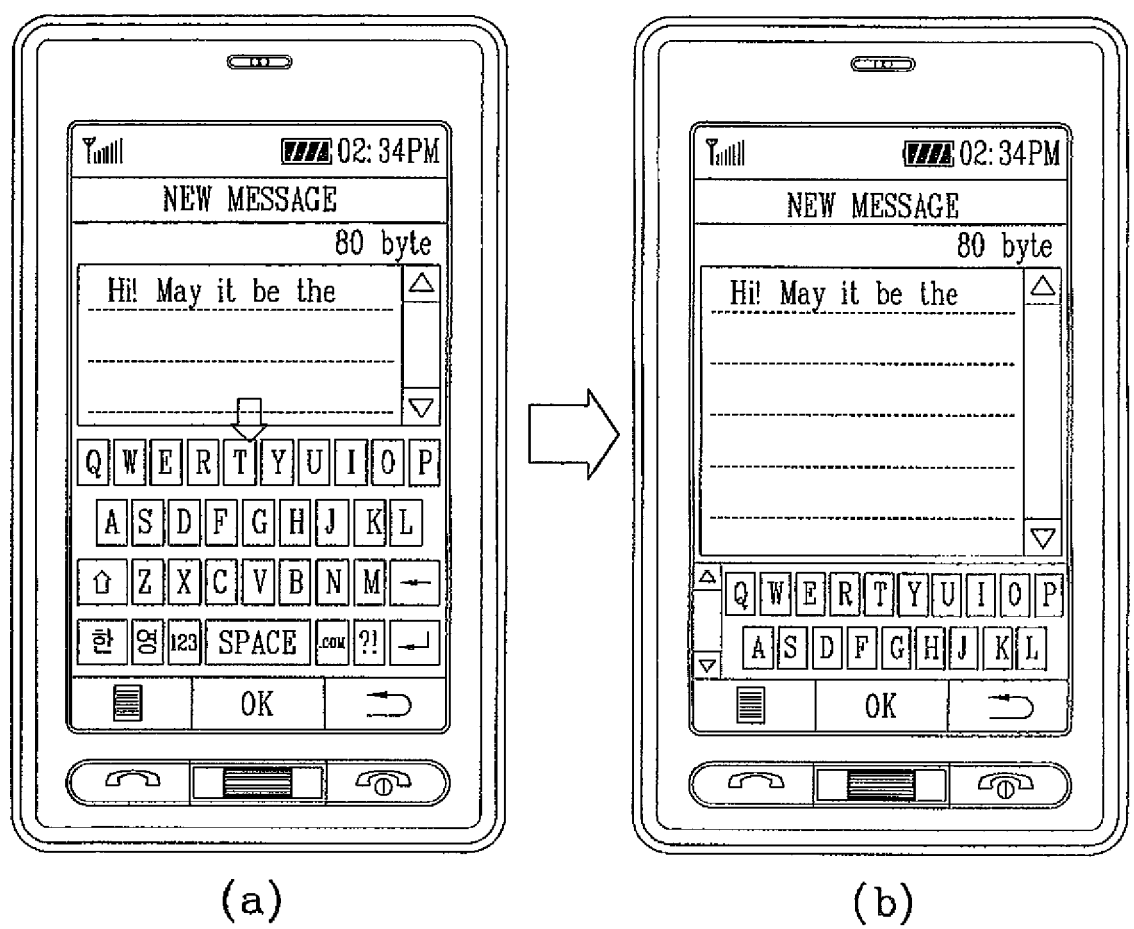
FIG. 20 is an overview of display screens for illustrating the method shown in FIG. 19 according to an embodiment of the present invention.

FIG. 19 is a flow chart illustrating a method of displaying a keypad of a mobile terminal according to another embodiment of the present invention, and FIG. 20 is an overview of display screens for illustrating the method shown in FIG. 19 according to an embodiment of the present invention;.

As shown in FIG. 19, the controller 180 displays the general type of keypad (S701). FIG. 20(a) also illustrates this feature. Then, the user adjust the boundary between the displays regions 151A and 151B (e.g., by touching and dragging a boundary line between the two display regions). The controller 180 then appropriately adjust the boundaries (S703). FIG. 20(b) illustrates first display region (text input region) being increases in size and the second display region 150B including the keypad being reduced in size. The scroll bar keypad is also displayed in the second region (S705).

Then, as in the above embodiments, the controller 180 determines when the scroll bar 401 displayed on the second display region 151 B is touched, and scrolls the keypad based on the amount of the scrolling operation (S709). For example, if the user has set the scrolling unit to be two rows of the keypad being scrolled at a single scrolling operation, the controller 180 scrolls two rows of the keypad for a single scrolling operation.

Figure 21:
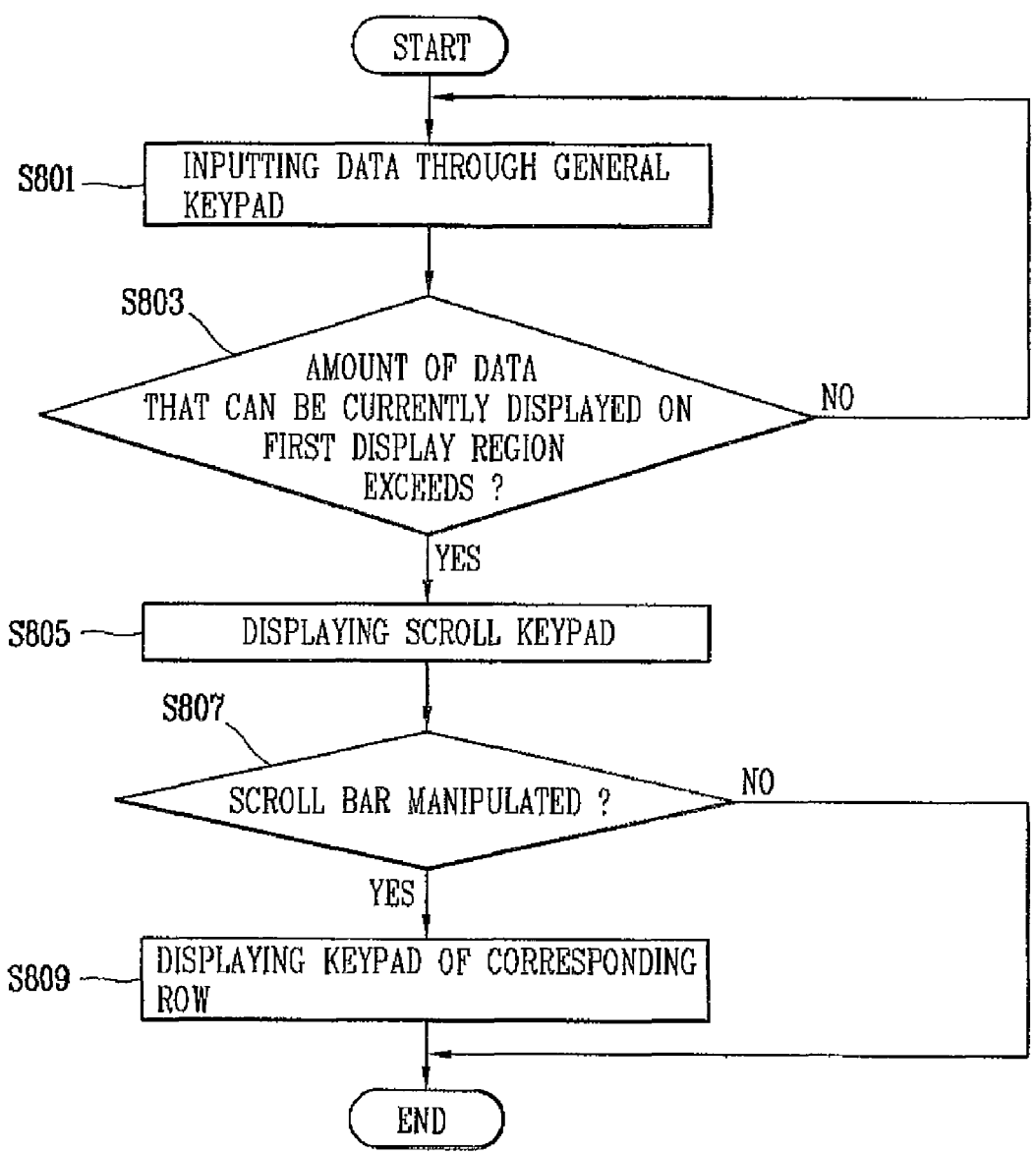
FIG. 21 is a flow chart illustrating a method of displaying a keypad of a mobile terminal according to still another embodiment of the present invention.

FIG. 21 is a flow chart illustrating a method of displaying a keypad of a mobile terminal according to still another embodiment of the present invention, and.

Figure 22:
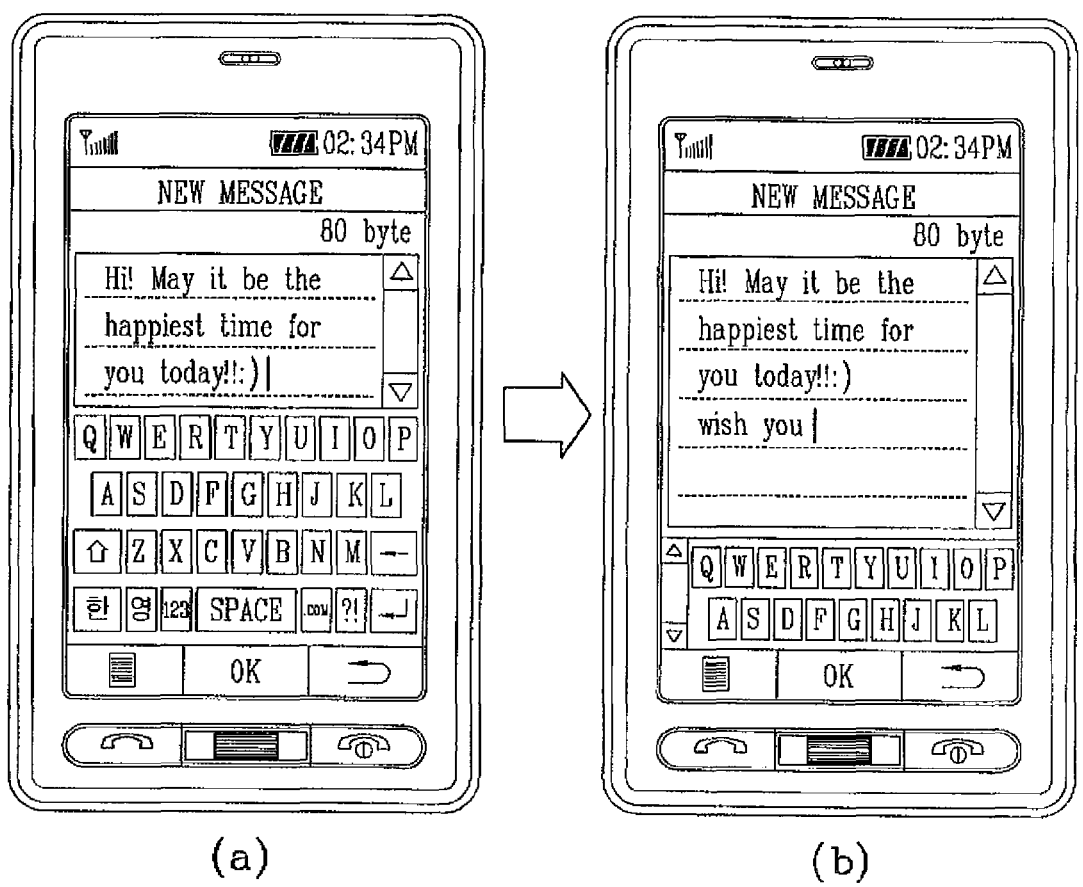
FIG. 22 is an overview of display screens for illustrating the method shown in FIG. 21 according to an embodiment of the present invention.

As shown in FIG. 21, when the user inputs data by using the general keypad displayed on the second display region 151B (S801), the controller 180 determines whether an amount of data that can be currently displayed on the first display region 151A has exceeded the size of the display region 151A (S803). FIG. 22(a) illustrates data input into the first display region and the keypad being displayed in the second display region. As shown in FIG. 22(a), the total amount of area for inputting text is going to be exceeded.

Thus, when the amount of data has exceeded the size of the display region 151A (Yes in S803), the controller 180 readjusts the first and second display regions 151A and 151B and displays the scroll bar keypad. In other words, the first display region 151A is be magnified to allow more information to be input or reviewed and the second display region 151B is relatively reduced with respect to the first display region 151A.

For example, as shown in FIG. 22(a), data is input in a state that the first display region 151A can display three rows of data. Thus, when the data fills the three rows and the cursor moves to the next row, the controller 180 immediately detects this operation and re-adjusts the first and second display regions 151A and 151B as shown in FIG. 22(b). As shown in FIG. 22(b), the controller 180 displays certain rows of the keypad and corresponding scroll bar on the second display region 151B (S805). Thereafter, when a scrolling operation is performed through the scroll bar (Yes in S807), the controller 180 scrolls the keypad (S809).

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
    a display unit configured to display a keypad in a second display region and data input from at least the keypad in a first display region; and
    a controller configured to determine if the keypad displayed in its current form is to be displayed in a new different form, to determine if all of the keypad in the new different form can be displayed to fit within the second display region, and to selectively control the display unit to display a scrolling function for scrolling the keypad displayed in the new different form when all of the keypad can not be displayed to fit within the second display region,
    wherein the controller is further configured to determine if the data input into the first display region has exceeded a predetermined amount of existing space for inputting the data in the first display region, and then to automatically control the display unit to display the keypad in the new different form and to display the scrolling function for scrolling the keypad displayed in the new different form, when the controller determines the data input into the first display region has exceeded the predetermined amount of existing space of the first display region.

2. The mobile terminal of claim 1, wherein the display unit is further configured to display the keypad in a form of an image or an icon in the second display region.

3. The mobile terminal of claim 1, wherein the new different form of the keypad comprises a keypad that is larger in size than the keypad displayed in its current form.

4. The mobile terminal of claim 1, wherein the new different form of the keypad comprises a keypad that that has a different arrangement of characters than the keypad displayed in its current form.

5. The mobile terminal of claim 1, wherein the keypad displayed in its current form does not include a scrolling function for scrolling the keypad.

6. The mobile terminal of claim 1, wherein the scrolling function comprises one of a scroll bar, a scroll button, a scroll key, a wheel, and a navigation key used to scroll the keypad.

7. The mobile terminal of claim 1, wherein the scrolling function comprises at least one of a touch sensor, a proximity sensor, and a tilt sensor used to scroll the keypad.

8. The mobile terminal of claim 1, wherein the controller is further configured to determine if a size of the keypad to be displayed in the new different form exceeds a predetermined size for the keypad, and to selectively control the display unit to display the scrolling function for scrolling the keypad displayed in the new different form when the size of the keypad to be displayed in the new different form exceeds the predetermined size for the keypad.

9. The mobile terminal of claim 8, wherein controller is further configured to change the size of the keypad based on a touching and dragging operation performed on the keypad displayed in its current form.

10. The mobile terminal of claim 1, wherein the controller is further configured to determine if the keypad to be displayed in the new different form is a scrolling keypad type, and to selectively control the display unit to display the scrolling function for scrolling the keypad displayed in the new different form when the keypad to be displayed in the new different form is the scrolling keypad type.

11. The mobile terminal of claim 1, wherein the controller is further configured to determine if the keypad to be displayed in the new different form is a magnified or reduced version of the keypad displayed in its current form, and to selectively control the display unit to display the scrolling function for scrolling the keypad displayed in the new different form when the size of the keypad to be displayed in the new different form exceeds the predetermined size for the keypad.

12. The mobile terminal of claim 11, wherein the controller is further configured to magnify or reduce the keypad based on a touching and dragging operation performed on the keypad displayed in its current form.

13. The mobile terminal of claim 12, wherein the controller is further configured to magnify the keypad based on the touching and dragging operation in a first direction and to reduce the keypad based on the touching and dragging operation in a second direction that is opposite to the first direction.

14. The mobile terminal of claim 1, wherein the controller is further configured to determine the keypad is to be displayed in the new different form based on a selected menu option, and to selectively control the display unit to display the scrolling function for scrolling the keypad displayed in the new different form when the selected menu option indicates to include the scrolling function with the keypad.

15. A method of controlling a mobile terminal, the method comprising:
    displaying a keypad in a second display region and data input from at least the keypad in a first display region;
    determining if the keypad displayed in its current form is to be displayed in a new different form;
    determining if all of the keypad in the new different form can be displayed to fit within the second display region;
    selectively displaying a scrolling function for scrolling the keypad displayed in the new different form when all of the keypad can not be displayed to fit within the second display region;
    determining if the data input into the first display region has exceeded a predetermined amount of existing space for inputting the data in the first display region; and
    automatically displaying the keypad in the new different form and displaying the scrolling function for scrolling the keypad displayed in the new different form, when the controller determines the data input into the first display region has exceeded the predetermined amount of existing space of the first display region.

16. The method of claim 15, wherein the displaying the keypad displays the keypad in a form of an image or an icon in the second display region.

17. The method of claim 15, wherein the new different form of the keypad comprises a keypad that is larger in size than the keypad displayed in its current form.

18. The method of claim 15, wherein the new different form of the keypad comprises a keypad that that has a different arrangement of characters than the keypad displayed in its current form.

19. The method of claim 15, wherein the keypad displayed in its current form does not include a scrolling function for scrolling the keypad.

20. The method of claim 15, wherein the scrolling function comprises one of a scroll bar, a scroll button, a scroll key, a wheel, and a navigation key used to scroll the keypad.

21. The method of claim 15, wherein the scrolling function includes at least one of a touch sensor, a proximity sensor, and a tilt sensor used to scroll the keypad.

22. The method of claim 15, further comprising:
determining if a size of the keypad to be displayed in the new different form exceeds a predetermined size for the keypad,
wherein the selectively displaying step displays the scrolling function for scrolling the keypad displayed in the new different form when the size of the keypad to be displayed in the new different form exceeds the predetermined size for the keypad.

23. The mobile terminal of claim 22, further comprising:
changing the size of the keypad based on a touching and dragging operation performed on the keypad displayed in its current form.

24. The mobile terminal of claim 15, further comprising:
determining if the keypad to be displayed in the new different form is a scrolling keypad type,
wherein the selectively controlling step displays the scrolling function for scrolling the keypad displayed in the new different form when the keypad to be displayed in the new different form is the scrolling keypad type.

25. The mobile terminal of claim 15, further comprising:
determining if the keypad to be displayed in the new different form is a magnified or reduced version of the keypad displayed in its current form,
wherein the selectively controlling step displays the scrolling function for scrolling the keypad displayed in the new different form when the size of the keypad to be displayed in the new different form exceeds the predetermined size for the keypad.

26. The mobile terminal of claim 25, further comprising:
magnifying or reducing the keypad based on a touching and dragging operation performed on the keypad displayed in its current form.

27. The mobile terminal of claim 26, wherein the magnifying step magnifies the keypad based on the touching and dragging operation in a first direction and reduces the keypad based on the touching and dragging operation in a second direction that is opposite to the first direction.

28. The mobile terminal of claim 15, further comprising:
determining the keypad is to be displayed in the new different form based on a selected menu option,
wherein the selectively controlling step displays the scrolling function for scrolling the keypad displayed in the new different form when the selected menu option indicates to include the scrolling function with the keypad.

\* \* \* \* \*